(12) United States Patent
Takenouchi

(10) Patent No.: US 9,459,816 B2
(45) Date of Patent: Oct. 4, 2016

(54) INFORMATION PROCESSING APPARATUS, METHOD, COMPUTER-READABLE STORAGE MEDIUM, AND INFORMATION PROCESSING SYSTEM

(71) Applicant: CANON KABUSHIKI KAISHA, Tokyo (JP)

(72) Inventor: Takuya Takenouchi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/693,360

(22) Filed: Apr. 22, 2015

(65) Prior Publication Data

US 2015/0317104 A1 Nov. 5, 2015

(30) Foreign Application Priority Data

May 2, 2014 (JP) ................. 2014-095509

(51) Int. Cl.
*G06F 15/00* (2006.01)
*G06F 3/12* (2006.01)
*H04L 12/58* (2006.01)
*H04L 29/08* (2006.01)
*G03G 15/00* (2006.01)

(52) U.S. Cl.
CPC ......... *G06F 3/1207* (2013.01); *G03G 15/5075* (2013.01); *G06F 3/1222* (2013.01); *G06F 3/1238* (2013.01); *G06F 3/1259* (2013.01); *G06F 3/1292* (2013.01); *H04L 51/14* (2013.01); *G03G 15/5079* (2013.01); *G03G 2215/00109* (2013.01); *G03G 2215/00126* (2013.01); *H04L 51/046* (2013.01); *H04L 51/32* (2013.01); *H04L 67/025* (2013.01)

(58) Field of Classification Search
CPC .................. H04L 51/046; G03G 15/5075
USPC .......................................... 358/1.15
See application file for complete search history.

(56) References Cited

U.S. PATENT DOCUMENTS

| 7,155,483 | B1 | 12/2006 | Friend et al. ................. 709/206 |
| 2006/0192998 | A1* | 8/2006 | Shima .................. G06F 3/1207 358/1.15 |
| 2011/0087705 | A1 | 4/2011 | Swink et al. ................. 707/800 |
| 2011/0196932 | A1 | 8/2011 | Jackson et al. ............... 709/206 |
| 2012/0044524 | A1* | 2/2012 | Kong ................. G03G 15/5079 358/1.15 |
| 2012/0229845 | A1* | 9/2012 | Maekawa ............. G06F 3/1205 358/1.15 |
| 2015/0046556 | A1 | 2/2015 | Takenouchi .................. 709/207 |

FOREIGN PATENT DOCUMENTS

EP 2 420 963 A1 2/2012
JP 2008-70967 A 3/2008

* cited by examiner

*Primary Examiner* — Saeid Ebrahimi Dehkordy
(74) *Attorney, Agent, or Firm* — Fitzpatrick, Cella, Harper & Scinto

(57) ABSTRACT

An information processing apparatus obtains a notification item regarding the status of a processing apparatus that executes predetermined processing. The information processing apparatus notifies an external apparatus of one or a plurality of messages so as to, when the number of notification items obtained within a predetermined time is equal to or smaller than a predetermined number, notify a plurality of messages corresponding to the plurality of notification items, and when the number of notification items exceeds the predetermined number, notify one message based on the contents of at least some items out of the plurality of notification items.

18 Claims, 18 Drawing Sheets

FIG. 8
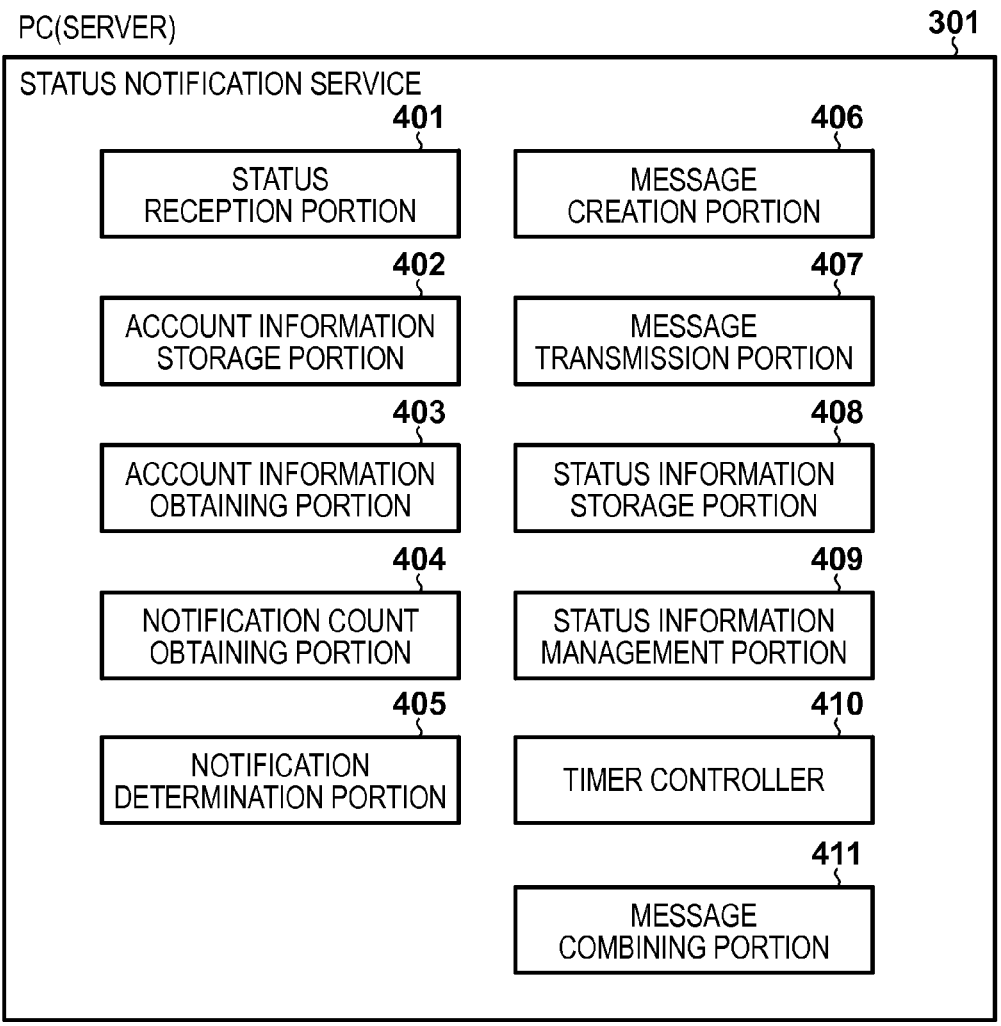
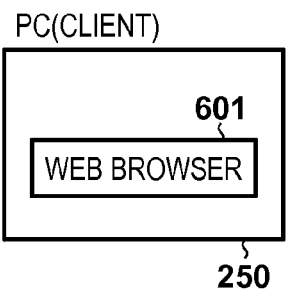
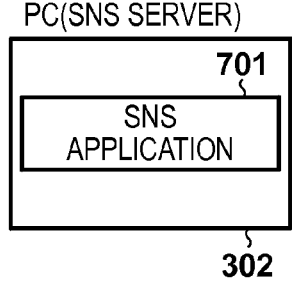

FIG. 9

| MFP_ID | SNS ACCOUNT |
|---|---|
| MFP100 | @mfp100 |
| . | . |
| . | . |
| . | . |

| MFP_ID | STATUS | RECEPTION DATE & TIME |
|---|---|---|
| MFP100 | PRINTING COMPLETION | 2013/10/10 14:13:13 |
| MFP100 | PRINTING COMPLETION | 2013/10/10 14:14:14 |
| . | . | . |
| . | . | . |
| . | . | . |

1101 / 1102 / 1103 / 1100

FIG. 13
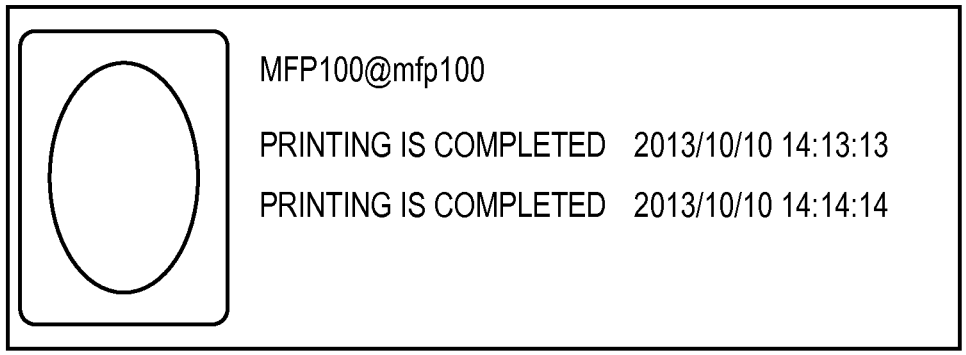
FIG. 14
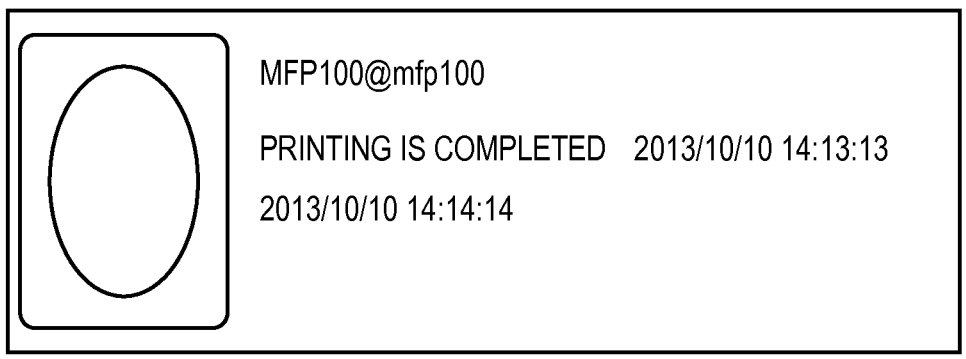
FIG. 15
| STATUS TYPE | ERROR DETERMINATION |
|---|---|
| PRINTING COMPLETION | FALSE |
| INK LOW | TRUE |
| ⋮ | ⋮ |

FIG. 17
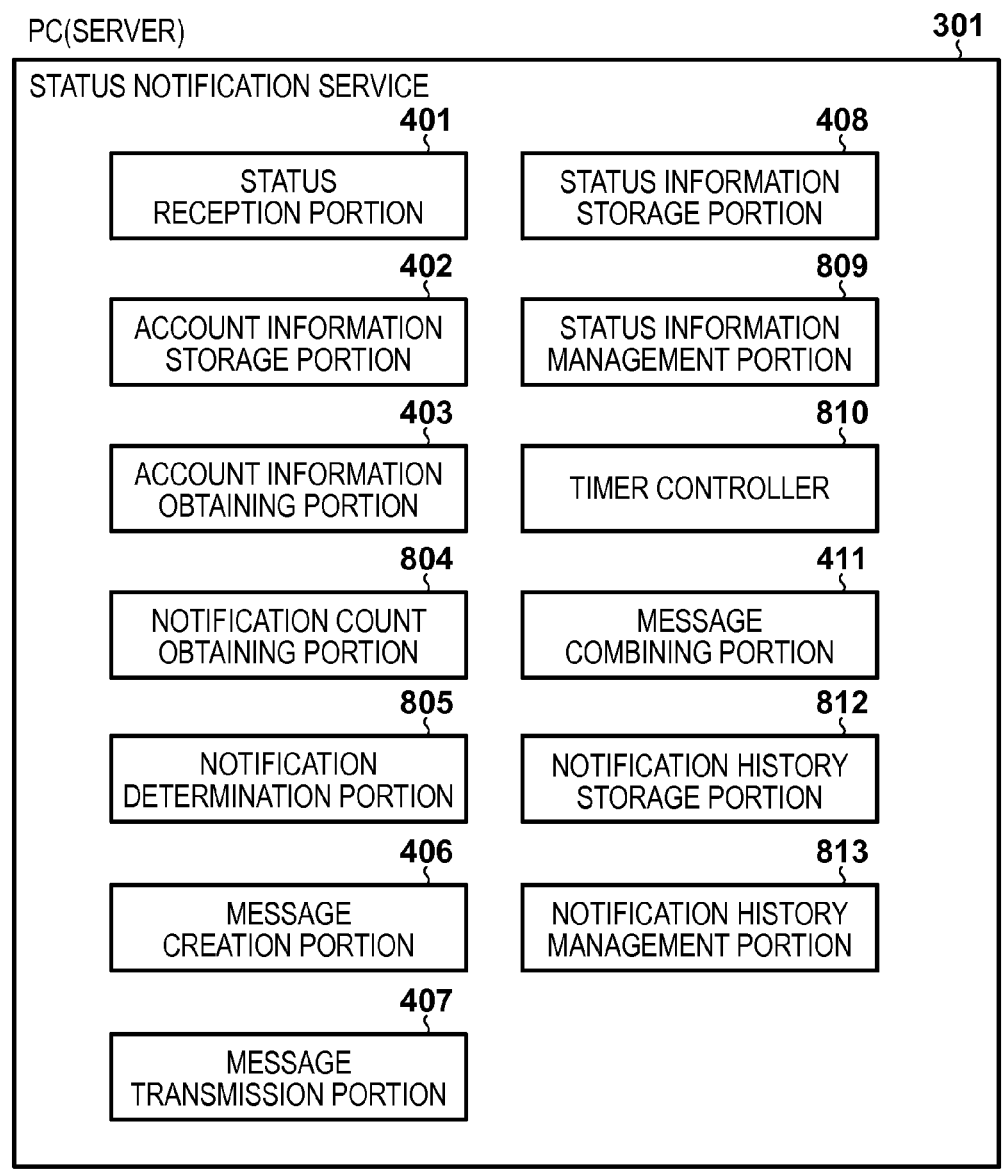
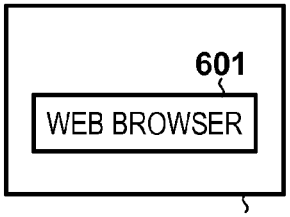
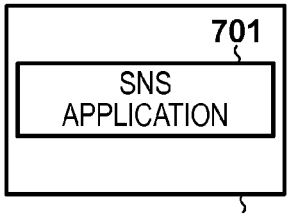

FIG. 18

| MFP_ID | NOTIFICATION COUNT | FINAL NOTIFICATION DATE & TIME |
|---|---|---|
| MFP100 | 1 | 2013/10/10 13:14 |
| . | . | . |
| . | . | . |
| . | . | . |

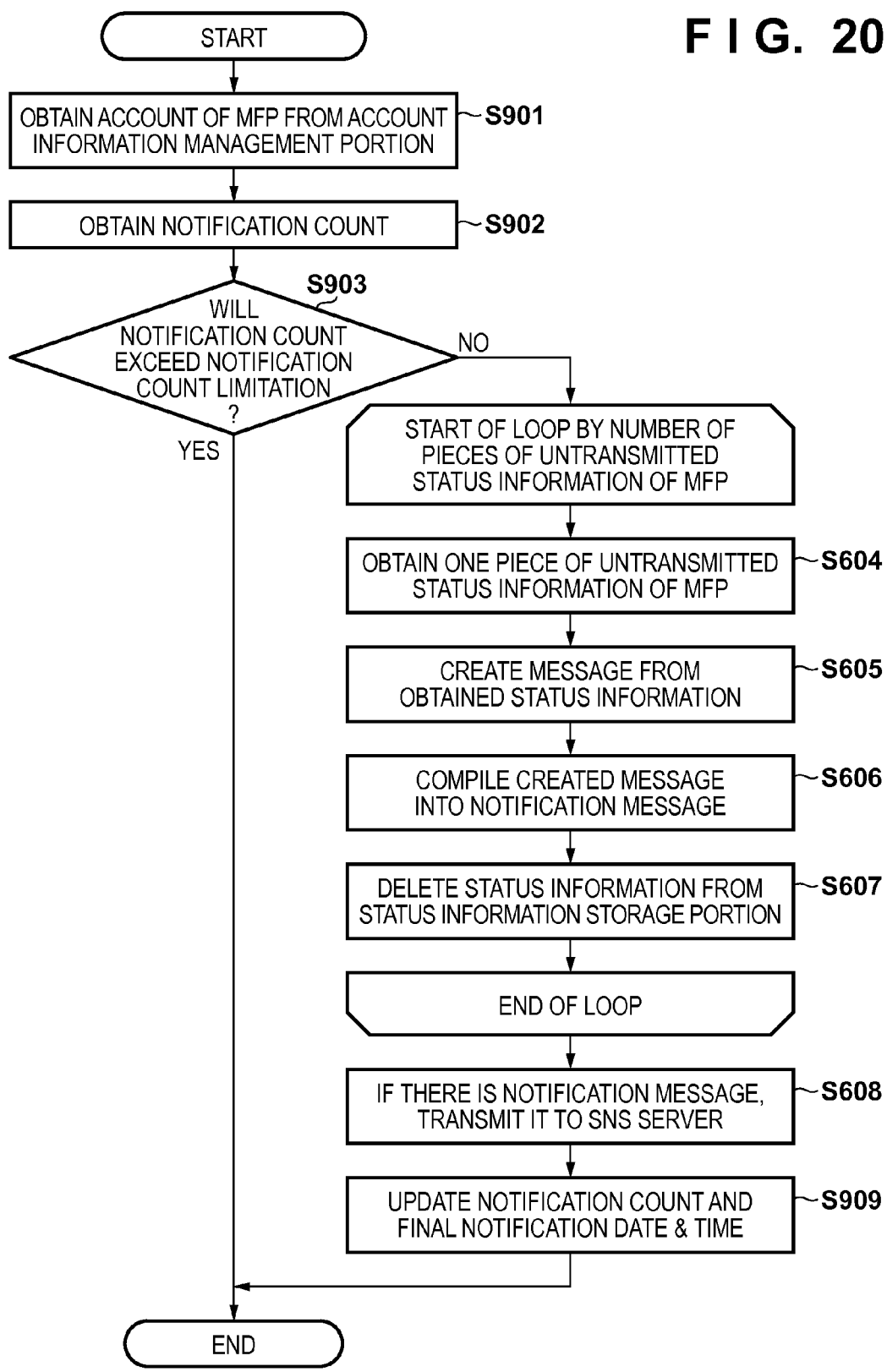
F I G. 20

FIG. 22
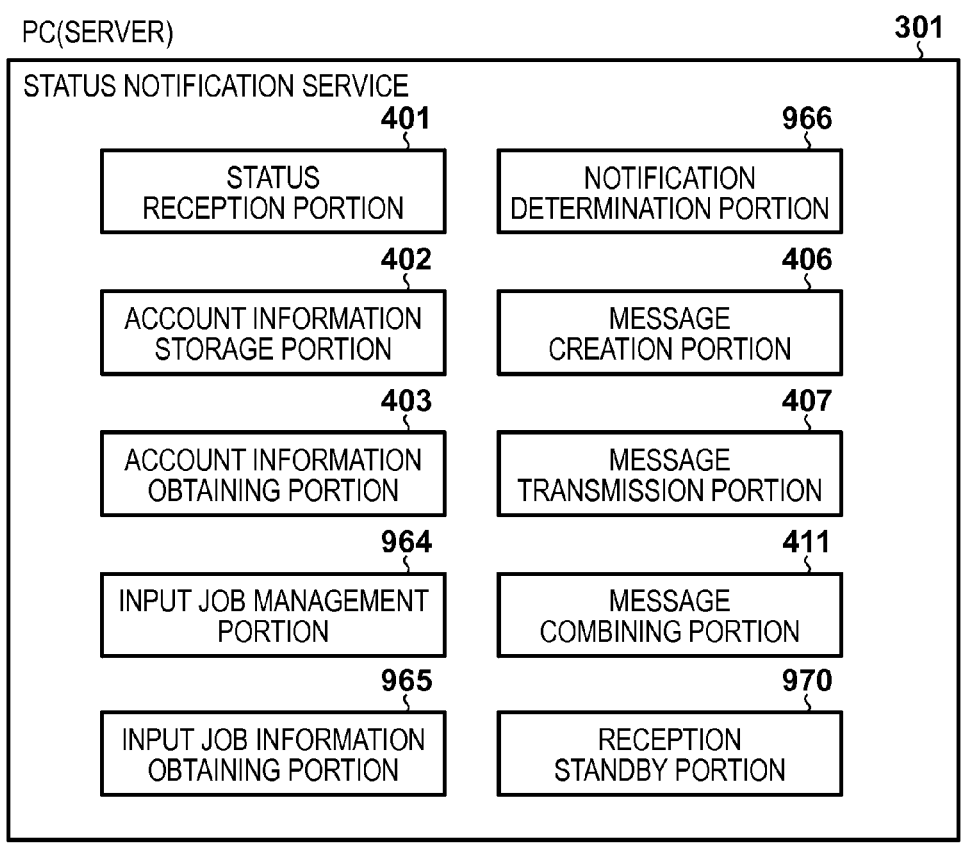
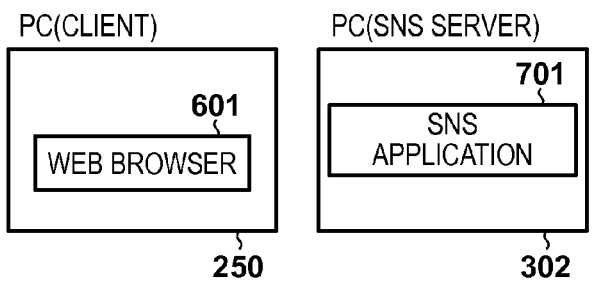

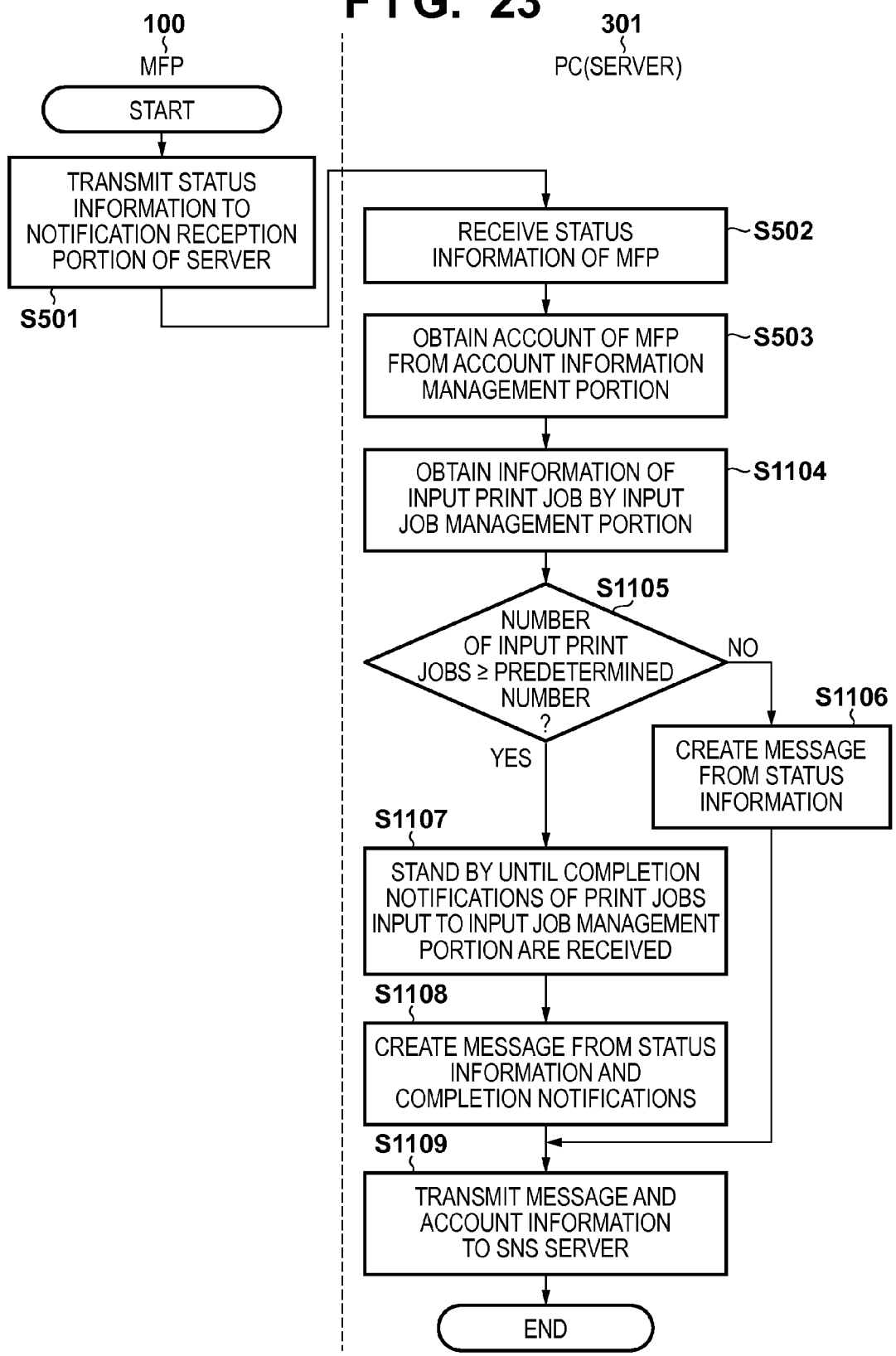

INFORMATION PROCESSING APPARATUS, METHOD, COMPUTER-READABLE STORAGE MEDIUM, AND INFORMATION PROCESSING SYSTEM

BACKGROUND OF THE INVENTION

1. Field of the Invention

The present invention relates to a technique of creating a message based on status information about a processing apparatus that executes predetermined processing.

2. Description of the Related Art

Recently, Internet services that are called SNS (Social Networking Service) and allow anybody to freely register have become widespread. Especially, a real-time communication tool such as Twitter® allows a registered user to transmit a message, like a tweet, called a miniblog in real time. The real-time communication tool also has a function of registering another user, and can receive more tweet messages in real time. Such a real-time communication tool sometimes has a limitation on the information notification count so as to prevent an increase in the communication load and the like. Even if there is no such notification count limitation, many notifications may complicate user confirmation, and the notification count is desirably suppressed in some cases.

On the other hand, there is a technique of notifying a user accessing an information processing apparatus of the status information of a remote home appliance or peripheral apparatus in real time using a system such as instant messaging. Examples of the home appliance and peripheral apparatus are a TV, refrigerator, washing machine, printer, copying machine, facsimile apparatus, scanner, digital camera, and multifunction peripheral including these functions. The home appliance or peripheral apparatus can communicate with an information processing apparatus connected to a network.

Further, there is also proposed the following technique (see Japanese Patent Laid-Open No. 2008-70967). When a peripheral apparatus and an information processing apparatus cannot communicate with each other owing to a fault or the like and the status information of the peripheral apparatus cannot be transmitted to the information processing apparatus, the status is temporarily stored in the peripheral apparatus. After recovery, the temporarily stored status information is transmitted to the information processing apparatus.

However, in Japanese Patent Laid-Open No. 2008-70967, when a plurality of notification items are temporarily stored, notification is performed a plurality of times. When, for example, many notification items are generated in a period in which communication is impossible, notification is performed many times after recovery.

SUMMARY OF THE INVENTION

The present invention provides a technique capable of appropriately creating a message based on status information.

To achieve the above object, an information processing apparatus according to the present invention has the following arrangement. That is, An information processing apparatus comprising: an obtaining unit configured to obtain a notification item regarding a status of a processing apparatus that executes predetermined processing; and a notification unit configured to notify an external apparatus of one or a plurality of messages so as to, in a case that the number of notification items obtained by the obtaining unit within a predetermined time is not larger than a predetermined number, notify a plurality of messages corresponding to the plurality of notification items, and in a case that the number of notification items exceeds the predetermined number, notify one message based on contents of at least some items out of the plurality of notification items.

According to the present invention, a message based on status information can be created appropriately.

Further features of the present invention will become apparent from the following description of exemplary embodiments (with reference to the attached drawings).

BRIEF DESCRIPTION OF THE DRAWINGS

FIG. 8 is a block diagram showing the software configurations of a server and client;

FIG. 9 is a table showing an account information correspondence table held by an account information storage portion;

FIG. 10 is a table showing an untransmitted status information correspondence table held by a status information storage portion;

FIG. 13 is a view showing a notification display screen to the user;

FIG. 14 is a view showing a notification display screen to the user;

FIG. 15 is a table showing a status information correspondence table held by a status information management portion;

FIG. 17 is a block diagram showing the software configurations of the server and client;

FIG. 18 is a table showing a notification history information correspondence table held by a notification history storage portion;

FIG. 20 is a flowchart showing the operation of the server;

FIG. 22 is a block diagram showing the software configurations of the server and client; and FIG. 23 is a flowchart showing the operation of the server.

DESCRIPTION OF THE EMBODIMENTS

Embodiments of the present invention will now be described in detail with reference to the accompanying drawings. It should be noted that the following embodiments are not intended to limit the scope of the appended claims, and that not all the combinations of features described in the embodiments are necessarily essential to the solving means of the present invention.

An MFP (Multi Function Peripheral), a PC (Personal Computer), a network configuration that connects them, and cloud printing using them in the following embodiments will be described.

Figure 1:
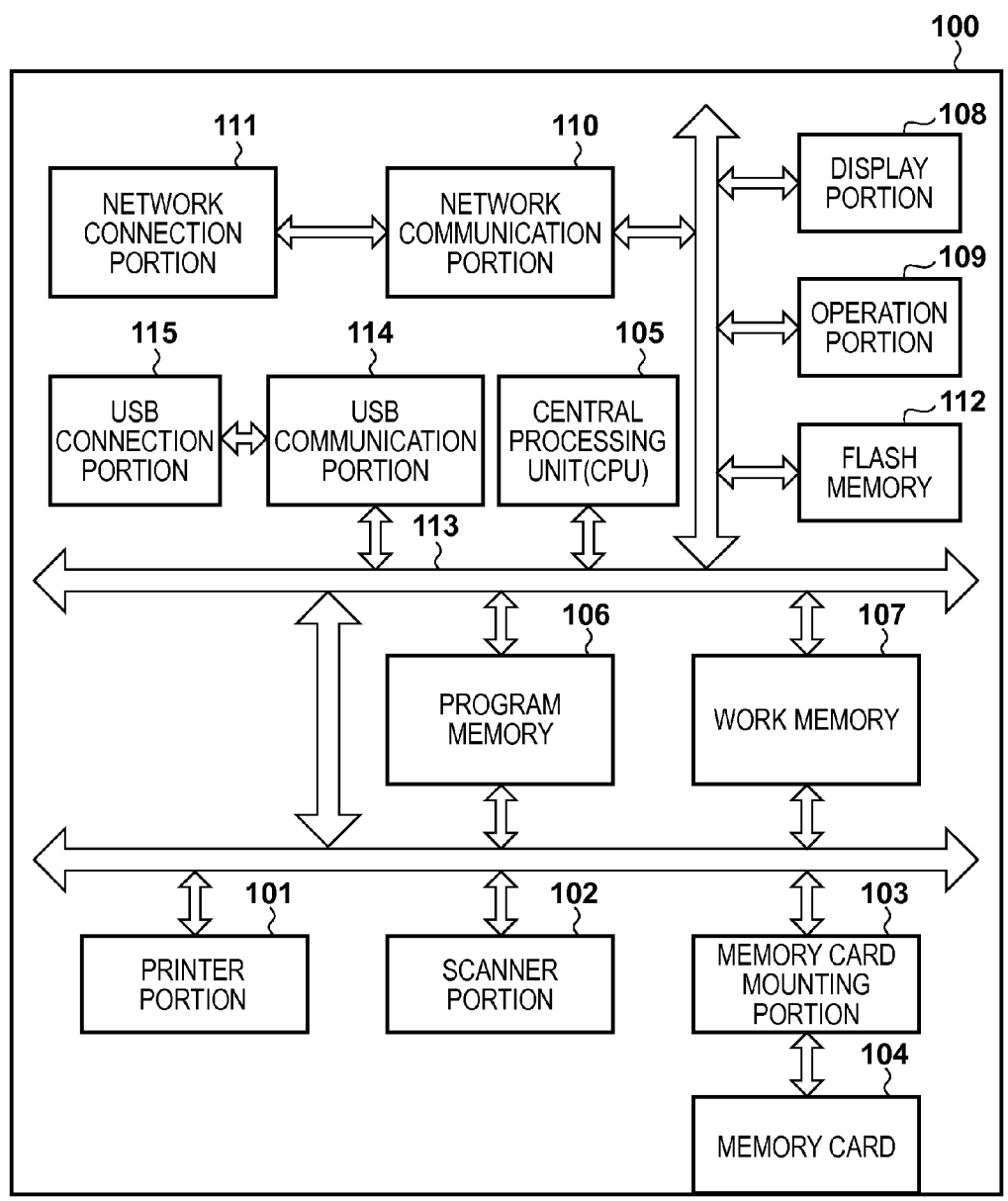
FIG. 1 is a block diagram showing the hardware configuration of an MFP.

FIG. 1 is a block diagram showing the schematic arrangement of an MFP 100 as an example of a peripheral apparatus. The MFP 100 has a printer function, scanner function, and storage function, and can provide the services of the respective functions via a network.

In the MFP 100, a printer portion 101 implements the printer function, and a scanner portion 102 implements the scanner function. A memory card mounting portion 103 and a memory card 104 implement the storage function.

The printer portion 101 prints data such as externally received print data or image data stored in the memory card 104 on printing paper by a printing method such as an inkjet method or an electrophotographic method. The scanner portion 102 optically reads an original set on a platen, converts it into digital data, further converts the digital data into data of a designated file format, and transmits it to an external apparatus via the network. Note that the MFP 100 may incorporate a storage area (not shown) for storing the data converted into digital data in the designated file format. A copy service transfers image data generated by reading an original set on the platen by the scanner portion 102 to the printer portion 101, and causes the printer portion 101 to print the original data on printing paper. Also, a file stored in the memory card 104 can be read out by an external apparatus connected via the network, edited, and stored in the memory card 104 from the eternal apparatus.

The MFP 100 further includes a central processing unit (CPU) 105 that controls various building components, and a program memory 106 such as a ROM that stores data such as program codes to be read out by the CPU 105. The MFP 100 also includes a work memory 107 such as a RAM for temporarily storing or buffering data such as image data when executing each service, a display portion 108 such as an LCD, and an operation portion 109 including switches and a touch panel. The CPU 105 can implement various processes (to be described later) by executing programs stored in the program memory 106 on the work memory 107.

The MFP 100 also includes a network communication portion 110 for connecting the MFP 100 to the network to perform various communications, and a network connection portion 111 for connecting the network communication portion 110 to a network medium. The network communication portion 110 supports at least either of a wired network and wireless network. When the network communication portion 110 supports a wired network, the network connection portion 111 serves as a connector for connecting the cable of the wired network to the MFP 100. When the network communication portion 110 supports a wireless network, the network connection portion 111 serves as an antenna.

The MFP 100 further includes a flash memory 112 that is a nonvolatile flash memory, in order to store data received by the network communication portion 110. The MFP 100 also includes a USB communication portion 114 for communicating with an information processing apparatus 200 (FIG. 2) via a USB (Universal Serial Bus) interface. The MFP 100 is connected to the information processing apparatus 200 via a USB connection portion 115 using a connector such as a USB connector.

Various building components of the MFP 100 are connected to each other by a signal line 113. In this manner, the MFP 100 is an image processing apparatus that processes an image by the printer function, scanner function, and storage function, and is also an image forming apparatus that forms an image by the printer function. Furthermore, the MFP 100 includes a web browser program in the program memory 106 and can perform HTTP communication or HTTPS communication with a server.

Figure 2:
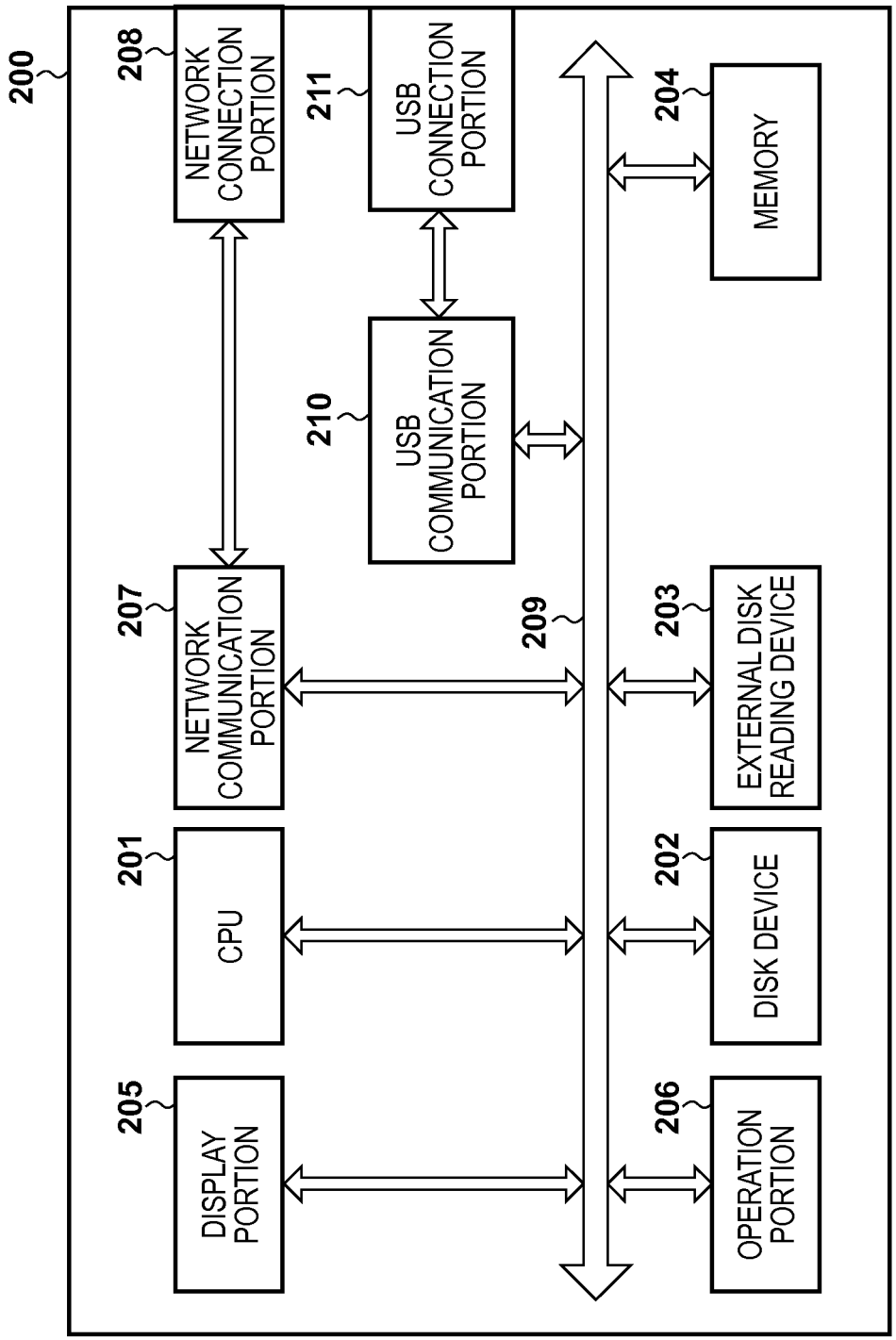
FIG. 2 is a block diagram showing the schematic arrangement of a PC as an example of an information processing apparatus and information processing server.

FIG. 2 is a block diagram showing the schematic arrangement of a client and server as an example of the information processing apparatus. The information processing apparatus 200 that implements the client or server can implement various processes (to be described later) by, for example, installing predetermined software in a general-purpose PC. The information processing apparatus 200 can function as a server or a client in accordance with the application and purpose.

Referring to FIG. 2, a CPU 201 controls various building components of the information processing apparatus 200. Application programs, an OS (Operating System), and the like to be read out by the CPU 201 are installed in a disk device 202. The disk device 202 also stores data such as various files.

A web browser is installed as one application program in a client 250 (FIG. 3) implemented by the information processing apparatus 200. A web application is installed in a server 301 (FIG. 3) implemented by the information processing apparatus 200. Note that the client 250 includes various information processing apparatuses such as a PC (Personal Computer), cell phone, smartphone, and PDA.

An external disk reading device 203 reads out the contents of an external storage medium such as a CD-ROM. The CPU 201 uses a memory 204 to perform processing such as temporary storage or buffering of data, as needed. The CPU 201 can implement various processes (to be described later) by executing various programs stored in the disk device 202 on the memory 204.

The CPU 201 executes, for example, the setup program of software for using the MFP 100 from the information processing apparatus 200, thereby installing various programs in the information processing apparatus 200. Various programs stored in the disk device 202 include various device drivers such as a scanner driver for using the scan function and a printer driver for using the printer function. These programs further include various applications such as a polling application for inquiring the state (for example, the presence/absence of an event) of the MFP 100, and management software (button monitor) for managing the state (status) of the MFP 100.

A display portion 205 includes an LCD. An operation portion 206 includes a keyboard and mouse. A network communication portion 207 connects the information processing apparatus 200 to a network to perform various communications. A network connection portion 208 connects the network communication portion 207 to a network medium.

As in the MFP 100, the network communication portion 207 and the network connection portion 208 support at least either of a wired network and wireless network. As a detailed form, the network communication portion 207 and the network connection portion 208 take necessary functions and forms in accordance with a supportable network, like the network communication portion 110 and network connection portion 111 incorporated in the MFP 100. A signal line 209 connects various building components. A USB communication portion 210 communicates with various processing apparatuses via a USB interface. A USB connection portion 211 is, for example, a USB connector.

In this way, the MFP 100 and the information processing apparatus 200 can be connected via a network and configured as an information processing system. This network is, for example, a local area network (LAN). In the following description, a network constituted by a network serving as a wired network cable will be handled, but the network is not limited to this. The form of the network does not change regardless of a wireless network, or a network in which a wired network and wireless network coexist.

Figure 3:
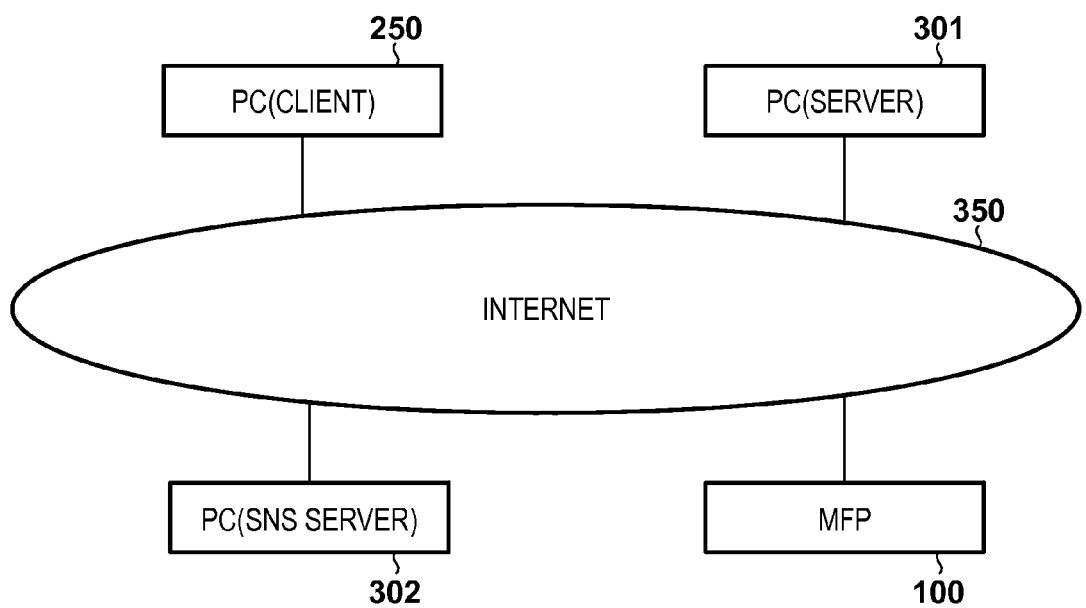
FIG. 3 is a block diagram showing a network configuration.

FIG. 3 is a block diagram showing the schematic arrangement of a network system constituted by the MFP 100 in FIG. 1 and the information processing apparatus 200 in FIG. 2. In FIG. 3, the network system includes the client 250, the server 301, and an SNS server 302, which are implemented by the information processing apparatus 200.

Referring to FIG. 3, a client OS is installed in the client 250. A server OS is installed in the server 301. A server OS is installed in the SNS server 302, and the SNS server 302 provides various services such as posting and browsing of a message. For example, the SNS server 302 provides, as a service, an SNS application that is a web application, such as Twitter®, serving as a real-time communication tool.

The MFP 100, the server 301, the SNS server 302, and the client 250 are connected to each other via Internet 350. The MFP 100 communicates with the server 301 via the Internet 350. The client 250 communicates with the server 301 via the Internet 350. Note that the connection method to the Internet 350 can be a wired network or a wireless network. The numbers of clients, servers, and MFPs connected to the Internet 350 are not limited to those of the example shown in FIG. 3, and a plurality of clients, servers, and MFPs can be connected in accordance with the application and purpose.

As print processing, general cloud printing will be additionally explained here. First, in the client 250, the user uses the web application of the server 301 via a web browser. The web application runs on the server 301. The user instructs the web application from the web browser of the client 250 to print, and designates the MFP 100 as an output destination printer.

The server 301 converts an application document created by the web application into a general-purpose digital document represented by PDF (Portable Document Format). The server 301 issues a drawing command using the digital document and separately stored print setting information. A printer driver installed in the server 301 converts the drawing command into a print command interpretable by the MFP 100 serving as an output destination, and transmits the print command to the MFP 100.

The MFP 100 performs a print operation in accordance with the received print command, and generates a printed product. The MFP 100 transmits status information to the server 301 at a predetermined interval. Types of status information include various many statuses such as start of printing, completion of printing, stop of printing, printing failure, printer busy, out of paper, paper jam, paper cassette exchange, ink low, out of ink, and cover open. These pieces of status information are temporarily stored as predetermined codes corresponding to the respective types in the work memory 107, and transmitted to the server 301 via the network connection portion 111.

Several embodiments implemented in the network system of FIG. 3 will be described below.

Note that a necessary condition to perform notification processing according to the embodiments (to be described later) is that the following processes are completed.

1. The user needs to create in advance his/her own account (to be referred to as account 1 hereinafter) in order to use an SNS application.
2. The user needs to create an account (to be referred to as account 2 hereinafter) for posting the status information of the MFP 100 in order to use an SNS application.
3. The user needs to do setting on the MFP 100 so as to post the status information of the MFP using account 2.
4. The user needs to follow account 2 (register the user so that posts of another user are displayed on his screen) using account 1 for using the SNS application.

Figure 4:
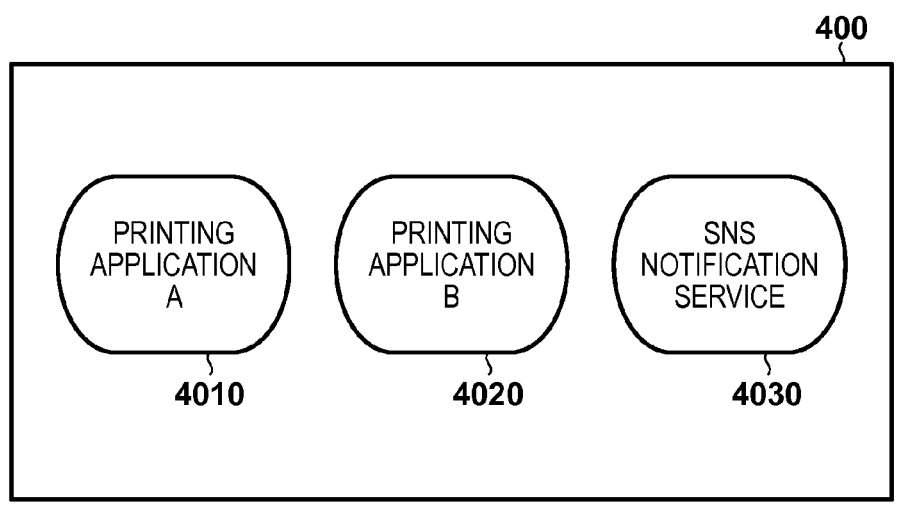
FIG. 4 is a view showing a menu screen displayed on a display portion by the MFP.

FIG. 4 is a view showing an example of a menu screen 400 that is displayed on the display portion 108 of the MFP 100 to execute various applications such as a printing application and SNS notification service. The menu screen 400 includes a button 4010 for executing printing application A, a button 4020 for executing printing application B, and a button 4030 for executing an SNS notification service. By pressing these buttons, the user can execute various processes for executing applications corresponding to these buttons.

Figure 5:
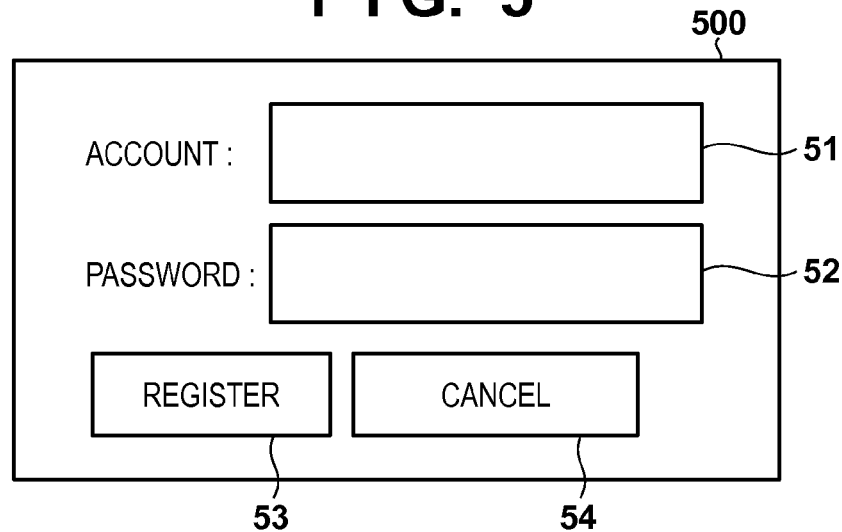
FIG. 5 is a view showing a registration screen displayed on the display portion by the MFP.
Figure 6A:
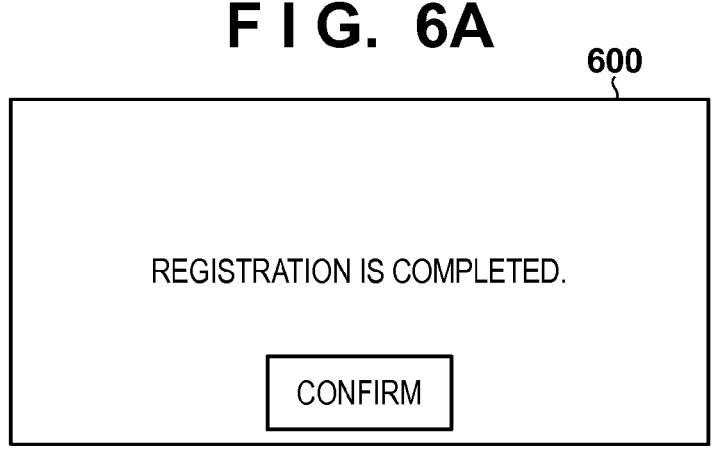
FIG. 6A is a view showing a registration completion screen displayed on the display portion by the MFP.
Figure 6B:
FIG. 6B is a view showing a registration failure screen displayed on the display portion by the MFP.

FIG. 5 is a view showing an example of a registration screen 500 for account 2 that is displayed on the display portion 108 of the MFP 100 in order to post the status information of the MFP 100. In the registration screen 500, an account input box 51 is a box used to input an account for using a predetermined service by the user from the operation portion 109. The predetermined service is, for example, an SNS notification service provided by the SNS server 302. A password input box 52 is a box used to input a password by the user from the operation portion 109. A registration button 53 is a button used to execute registration processing based on an account input to the account input box 51 and a password input to the password input box 52. A cancel button 54 is a button used to cancel registration processing and end the processing. When registration processing is executed using the registration button 53 and the registration succeeds, a registration completion screen 600 shown in FIG. 6A is displayed. If the registration fails, a registration failure screen 610 shown in FIG. 6B is displayed.

Figure 7:
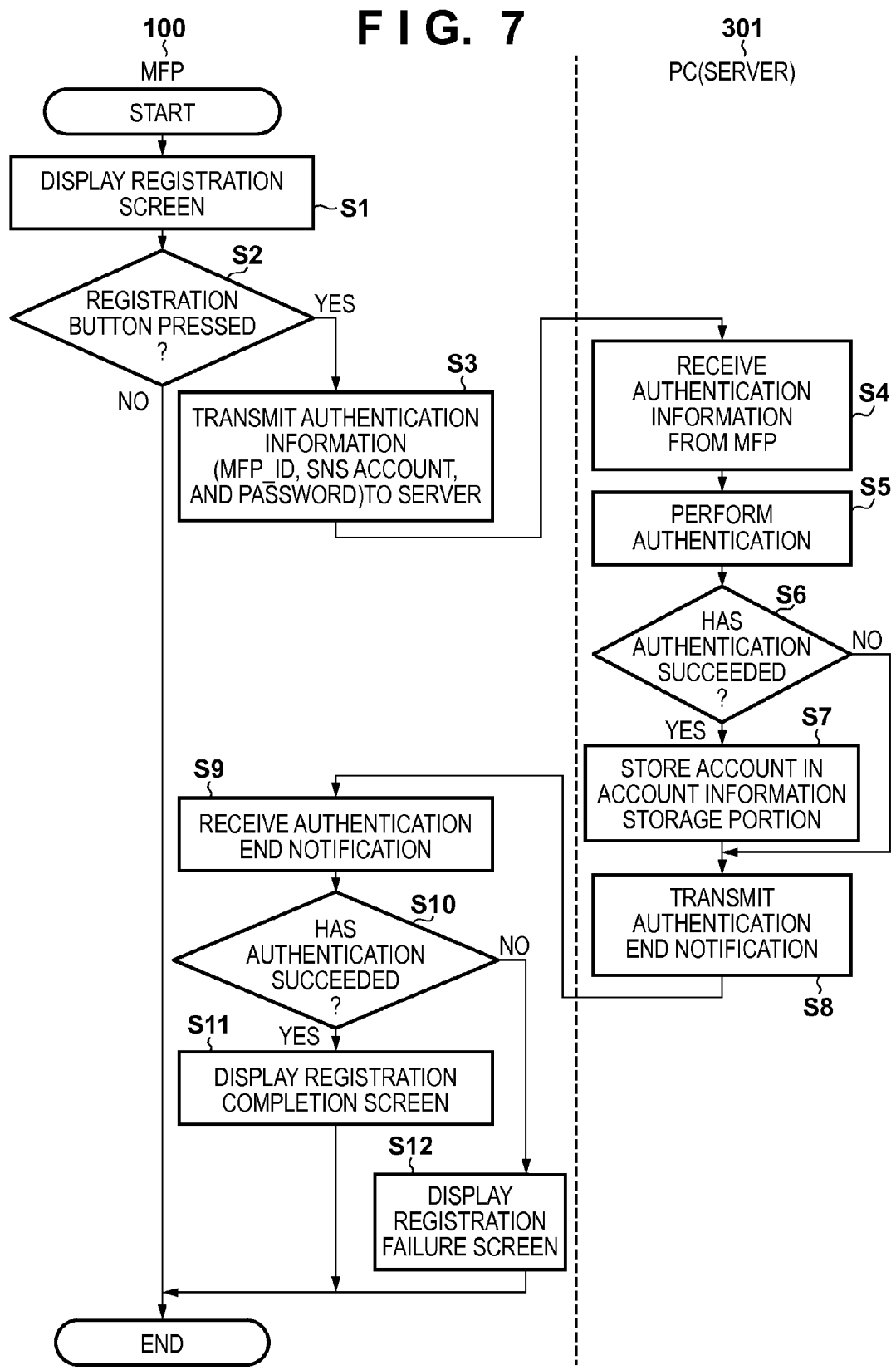
FIG. 7 is a flowchart showing the operation of the MFP at the time of registering an SNS account.

FIG. 7 is a flowchart showing registration & authentication processing.

When the user presses the button 4030 corresponding to the SNS notification service in the menu screen 400 of FIG. 4 in order to use the SNS notification service by the user, this processing starts to perform notification processing according to an embodiment (to be described later) between the MFP 100 and the server 301. The processing shown in FIG. 7 is implemented by executing a program stored in the program memory 106 on the work memory 107 by the CPU 105 of the MFP 100, and executing a program stored in the disk device 202 on the memory 204 by the CPU 201 of the server 301.

First, in step S1, the MFP 100 displays the registration screen 500 of FIG. 5 on the display portion 108. Then, in step S2, the MFP 100 determines whether the user has pressed the registration button 53 in the registration screen 500. If the user has not pressed the registration button 53 (NO in step S2), that is, if the user has pressed the cancel button 54, the process ends. Alternatively, the processing may stand by until the user presses the registration button 53.

If the user has pressed the registration button 53 (YES in step S2), the process advances to step S3. In step S3, the MFP 100 transmits, to the server 301, authentication information including the MFP_ID (unique ID assigned to each MFP) of the MFP 100, an SNS account input to the account input box 51, and a password input to the password input box 52.

In step S4, the server 301 receives, from the MFP 100, the authentication information including the MFP_ID, SNS account, and password. In step S5, the server 301 performs, based on the SNS account and password included in the authentication information, user authentication of an SNS application for implementing the SNS notification service. In step S6, the server 301 determines whether the user authentication of the SNS application has succeeded. If the server 301 determines that the user authentication has succeeded (YES in step S6), it stores, in an account information storage portion 402 (FIG. 8; to be described later) in step S7, the account received from the MFP 100 as information corresponding to the MFP_ID received from the MFP 100. Thereafter, the process advances to step S8. If the server 301 determines that the user authentication has failed (NO in step S6), the process advances to step S8. In step S8, the server 301 transmits, to the MFP 100, an authentication end notification representing the result of the user authentication. The authentication end notification includes authentication information representing the success/failure of user authentication.

In step S9, the MFP 100 receives the authentication end notification from the server 301. In step S10, the MFP 100 determines, from the authentication end notification, whether the user authentication has succeeded. If the MFP 100 determines that the user authentication has succeeded (YES in step S10), it displays the registration completion screen 600 shown in FIG. 6A on the display portion 108 in step S11. If the MFP 100 determines that the user authentication has failed (NO in step S10), it displays the registration failure screen shown in FIG. 6B on the display portion 108 in step S12.

After the end of the above-described processing, the setting to post the status information of the MFP 100 by using the SNS account is completed.

With this setting, the SNS server 302 can notify the client 250 of the status information of the MFP 100. Assume that the SNS server 302 has a limitation on the count of notification of status information within a predetermined time. The reason of placing the limitation is, for example, to suppress the communication load. Even if notification items (pieces of status information) more than the limitation are generated in the MFP 100 within the predetermined time and the SNS server 302 receives a notification request, the SNS server 302 does not notify the client 250.

In this embodiment, therefore, when the status information notification count exceeds an upper limit within the predetermined time, as described above, status information that compiles the contents of pieces of status information is created and notified. As a result, the status information notification count can be suppressed, and the contents of the pieces of status information can be appropriately notified. The above-described processing will be explained in detail.

<First Embodiment>

In the first embodiment, a server 301 determines whether the notification count will exceed the notification count limitation of status notifications in a real-time communication tool (service) provided by an SNS server 302. If the server 301 determines that the notification count will exceed the notification count limitation, it compiles pieces of status information transmitted from an MFP 100 and notifies them (batch notification). More specifically, in the first embodiment, the server 301 acquires, from the SNS server 302, a remaining notifiable count to the real-time communication tool at the time of receiving status information, and determines whether the notification count will exceed the notification count limitation. If the server 301 determines that the notification count will exceed the notification count limitation, it temporarily stores pieces of status information in a database, and separately compiles and notifies them, thereby controlling not to exceed the notification count limitation. In this case, information that compiles pieces of status information, of which a client should have been notified, is created and notified.

As a result, the server 301 can notify a client 250 of pieces of status information, of which the user should be notified, without exceeding the notification count limitation in the real-time communication tool or missing status information.

Note that this embodiment will explain an example in which a status notification is transmitted from the MFP 100 to the server 301 upon completion of printing, but the status notification timing is not limited to this. A status notification may also be transmitted at an arbitrary timing before the start of printing, upon a change of the status, or the like. A status notification may also be transmitted from the MFP 100 to the server 301 by polling of inquiring status information of the MFP 100 from the server 301.

FIG. 8 is a block diagram showing the software configurations of respective apparatuses constituting the system of the server 301. Note that the server 301 has the same arrangement as that shown in FIG. 2. Each control portion (software module) shown in FIG. 8 is stored as a program in the ROM of the server 301. The CPU of the server 301 reads out the program from the ROM and executes it on the RAM, and the CPU operates as each control portion shown in FIG. 8.

The server 301 includes a status notification service. By using the status notification service, the server 301 receives status information from the MFP 100, and determines whether the notification count will exceed a notification count limitation within a predetermined time in a real-time communication tool. If the server 301 determines that the notification count will not exceed the notification count limitation, it creates a message from status information and transmits the message to the SNS server 302. If the server 301 determines that the notification count will exceed the notification count limitation, it performs processing of compiling and notifying pieces of status information upon the lapse of the predetermined time.

The status notification service provided by the server 301 provides a plurality of kinds of functions. A status reception portion 401 receives the status information of the MFP 100 from the MFP 100. The MFP_ID of the MFP 100 that has transmitted the status information is added to the status information. An account information storage portion 402 stores and manages SNS account information that is registered for each MFP in order to use an SNS service (for example, real-time communication tool) provided by the SNS server 302. An account information obtaining portion 403 obtains SNS account information that has been registered in advance in the MFP 100 by the account information storage portion 402. A notification count obtaining portion 404 obtains, from the SNS server 302, a remaining notifiable count to the real-time communication tool for the SNS account obtained by the account information obtaining portion 403. Based on the notifiable count obtained by the notification count obtaining portion 404, a notification determination portion 405 determines whether the notification count will exceed the notification count limitation in the real-time communication tool.

A message creation portion 406 creates a notification message from status information. A message transmission portion 407 transmits a notification message and an SNS account to the SNS server 302 via a network (for example, Internet). When the notification determination portion 405 determines that the notification count will exceed the notification count limitation, a status information storage portion 408 stores and manages the status information as untransmitted status information in the internal RAM of the server, an external or internal hard disk, or the like. A status information management portion 409 manages the status information storage portion 408. A timer controller 410 issues an instruction to the status information management portion 409 at a predetermined time interval to manage the status information storage portion 408.

A message combining portion 411 performs combination of compiling, into one, a plurality of notification messages created by the message creation portion 406. More specifically, when pieces of untransmitted status information have been stored in the status information storage portion 408, the message combining portion 411 creates status information that compiles the pieces of status information. That is, the message combining portion 411 creates a notification message that compiles a plurality of notification messages, details of which will be described later.

An SNS application 701 of the SNS server 302 is a real-time communication tool such as Twitter® and provides, as a service, an SNS application serving as a web application.

A web browser 601 of the client 250 uses the web application of the server 301 or SNS server 302. The web browser 601 can instruct the web application provided by the server 301 to print, and designate the MFP 100 as an output destination printer. The web browser 601 of the client 250 uses the web application (real-time communication tool) of the SNS server 302. The web browser 601 of the client 250 can receive the status information of the MFP 100 from the server 301 via the SNS server 302.

A table 1000 in FIG. 9 is a table that is held by the account information storage portion 402 and stores SNS account information for each MFP. An MFP_ID 1001 is an ID assigned to each MFP, has a value that does not overlap in the table 1000, and serves as a primary key when searching the table 1000 for the SNS account information of the MFP. An SNS account 1002 is SNS account information registered in the MFP. By looking up the table 1000, the account information obtaining portion 403 specifies the MFP_ID 1001 of an MFP that has notified status information, and specifies the SNS account 1002 corresponding to the MFP_ID 1001. The message creation portion 406 transmits the SNS account 1002 and the status information (notification message) to the SNS server 302. Hence, the status information corresponding to the MFP can be notified toward the SNS account (for example, the account of the owner of the MFP) corresponding to the MFP.

A table 1100 in FIG. 10 is a table that is held by the status information storage portion 408 and stores untransmitted status information. An MFP_ID 1101 is an ID assigned to each MFP, has a value that does not overlap in the table 1100, and serves as a primary key when searching the table 1100 for the status information of the MFP. A status 1102 is the status information of the MFP. A reception date & time 1103 is the date & time when the status information was received. In addition, the table 1100 can store data that is managed and held for each MFP. Examples of such data are destination information of the MFP and version information of the MFP, but other items may exist.

Figure 11:
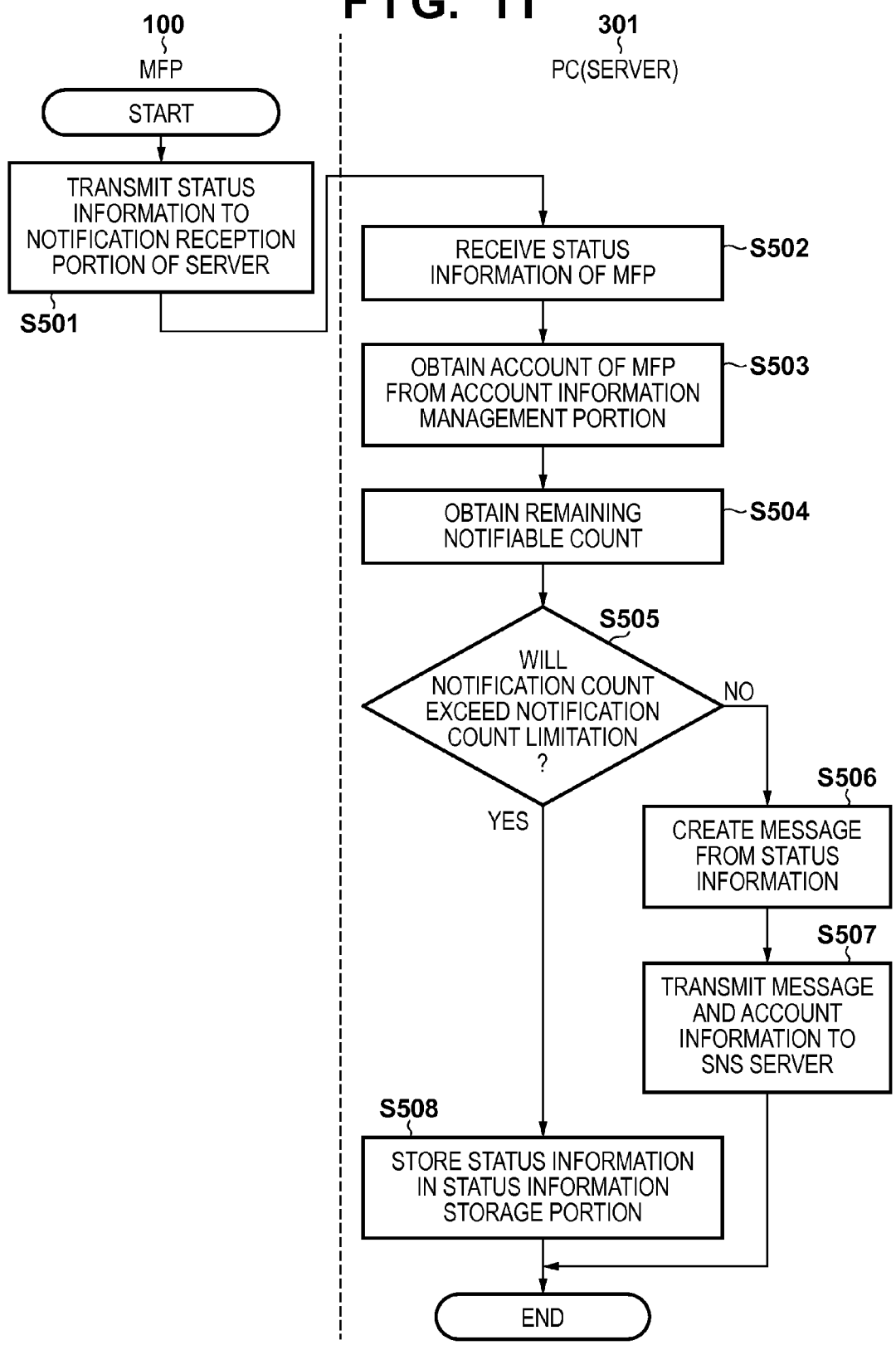
FIG. 11 is a flowchart showing the operations of the MFP and server.

FIG. 11 is a flowchart showing processing of notifying the SNS server 302 via the server 301 of the status of the MFP 100. The processing shown in FIG. 11 is implemented by executing a program stored in a program memory 106 on a work memory 107 by a CPU 105 of the MFP 100, and executing a program stored in a disk device 202 on a memory 204 by a CPU 201 of the server 301.

In step S501, the MFP 100 transmits status information to the status reception portion 401 of the server 301. Note that this status information corresponds to one or a plurality of notification items. For example, when printing was performed a plurality of times based on a plurality of print jobs, "printing completion" statuses corresponding to the respective print jobs serve as a plurality of notification items. Alternatively, when printing was completed first time but interrupted second time owing to an error such as out of ink, "printing completion" and "error" are transmitted as a plurality of notification items from the MFP 100.

Further, a table regarding the status of the MFP 100 may be transmitted as status information. Assume that "0" or "1" is input for each of items such as "printing completion", "out of ink", and "paper jam" in this table. As for an item in which "1" is input, assume that the MFP 100 is now in a state corresponding to the notification item. This item is regarded as a designated notification item to be notified, and serves as a notification target to the SNS server 302.

Status information transmitted from the MFP 100 may not be information individually corresponding to each notification item. The status information may be, for example, information that compiles a plurality of statuses such as "printing completion and error" or "printing completion of four print jobs".

In step S502, the status reception portion 401 of the server 301 receives the status information from the MFP 100. Not only the status of the MFP 100 but also the MFP_ID of the MFP 100 are added to the status information. In step S503, the account information obtaining portion 403 of the server 301 obtains the SNS account 1002 that is defined for the MFP_ID 1001, matching the MFP_ID, in the table 1000 held by the account information storage portion 402. In step S504, the notification count obtaining portion 404 of the server 301 obtains, from the SNS server 302, a remaining notifiable count to the real-time communication tool for the SNS account upon receiving the status information in step S502. In the SNS server 302, a notifiable count within a predetermined time is set for each SNS account. The notifiable count obtained in step S504 changes depending on the time or the SNS account.

In step S505, the notification determination portion 405 of the server 301 determines, from the notifiable count, whether the notification count for the SNS account will exceed the notification count limitation in the real-time communication tool. Whether the notification count will exceed the notification count limitation is determined by determining whether one or a plurality of notification items corresponding to the status information received in step S502 will exceed the notification count limitation. Alternatively, this determination is made based on whether the number of notification items will exceed a notification count in a predetermined range from the notification count limitation.

If the notification determination portion 405 of the server 301 determines that the notification count will not exceed the notification count limitation (NO in step S505), the message creation portion 406 of the server 301 creates a message from the status information in step S506. In step S507, the message transmission portion 407 of the server 301 transmits the message and the account information to the SNS server 302.

If the notification determination portion 405 of the server 301 determines that the notification count will exceed the notification count limitation (YES in step S505), it additionally stores the status information in the status information storage portion 408 in step S508.

Figure 12:
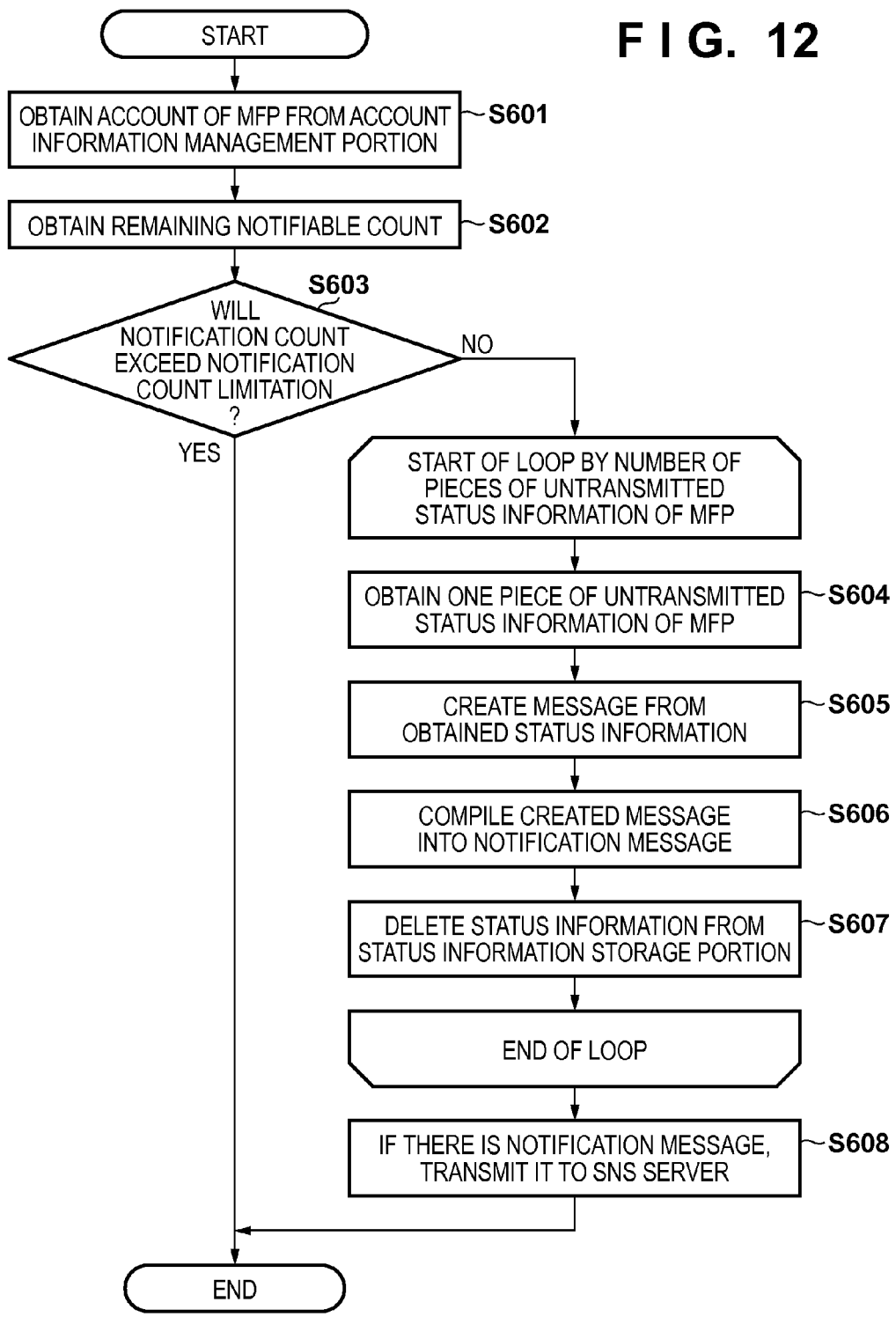
FIG. 12 is a flowchart showing the operation of the server.

FIG. 12 is a flowchart showing processing of automatically compiling and transmitting, by the status information management portion 409, pieces of untransmitted status information registered in the status information storage portion 408. The processing shown in FIG. 12 is implemented by executing a program stored in the disk device 202 on the memory 204 by the CPU 201 of the server 301.

Note that the remaining notifiable count in the real-time communication tool is reset at a predetermined timing, and the notifiable count can have a margin. If nothing is done, pieces of untransmitted status information stored in the status information storage portion 408 are endlessly accumulated to be an enormous amount. To prevent this, in accordance with an instruction from the timer controller 410, the status information management portion 409 executes processing of always monitoring the status information storage portion 408 in a predetermined cycle, and compiling and transmitting (batch transmission) pieces of untransmitted status information in every predetermined cycle.

In step S601, the status information management portion 409 of the server 301 causes the account information obtaining portion 403 to obtain the SNS account 1002 that is defined for the MFP_ID 1001, matching the MFP 100, in the table 1000 held by the account information storage portion 402. In step S602, the status information management portion 409 of the server 301 causes the notification count obtaining portion 404 to obtain, from the SNS server 302, a remaining notifiable count for the real-time communication tool corresponding to the SNS account.

In step S603, the status information management portion 409 of the server 301 causes the notification determination portion 405 to determine, from the notifiable count, whether the notification count for the SNS account will exceed the notification count limitation in the real-time communication tool. If the notification determination portion 405 determines that the notification count will exceed the notification count limitation (YES in step S603), the process ends.

If the notification determination portion 405 determines that the notification count will not exceed the notification count limitation (NO in step S603), the processes in steps S604 to S606 are looped and executed by the number of pieces of untransmitted status information.

In step S604, the status information management portion 409 obtains status information including the status 1102 and reception date & time 1103 that are defined for the MFP_ID 1101, matching MFP_ID1, in the table 1100 held by the status information storage portion 408.

In step S605, the status information management portion 409 of the server 301 causes the message creation portion 406 to create a message from the status information. In step S606, the status information management portion 409 of the server 301 causes the message combining portion 411 to compile the created message into a notification message. For example, when a message corresponding to the first status information as untransmitted status information is created in step S605, a notification message including this message is created. To the contrary, when messages corresponding to the second and subsequent pieces of status information are created in step S605, the contents of these messages are additionally written in the already created notification message (including the first message).

In step S607, the status information management portion 409 of the server 301 deletes the obtained status information from the status information storage portion 408. The status information management portion 409 repetitively performs steps S604 to S607 for all pieces of status information of the MFP 100 that are stored in the status information storage portion 408. In step S608, if there is a notification message, the status information management portion 409 of the server 301 causes the message transmission portion 407 to transmit the notification message to the SNS server 302.

By the processing in step S608, the SNS server 302 displays the notification message as a message to the SNS account. That is, the client 250 receives the message via the SNS server 302.

According to the processing of FIG. 12, when pieces of status information (a plurality of notification items) have not been transmitted, they are compiled into one notification message by the processing of step S605, and the notification message is transmitted to the SNS server 302. Therefore, even if the SNS server 302 has a limitation on the notification count, the notification count can be reduced.

As the method of reducing the notification count, there is a method of, for example, selecting one notification item from a plurality of notification items, and notifying only this notification item. However, this method does not notify the client of the items other than the selected notification item.

To solve this, in step S605, a plurality of notification items are compiled to create one notification message reflecting the plurality of notification items. The user of the client apparatus to which the notification message has been transmitted can recognize the presence of the plurality of notification items.

Although the status information management portion 409 deletes obtained status information from the status information storage portion 408 in step S607, the obtained status information may not be deleted in a method of avoiding re-notification of obtained status information. For example, a transmission completion flag representing that status information has been transmitted may be added to status information so as to discriminate transmitted status information and untransmitted status information.

By the processing of FIG. 12, the SNS server 302 receives a message and SNS account information transmitted from the server 301. The SNS server 302 regards the received message as a post of the SNS account, and outputs a message as shown in FIG. 13 on the timeline displayed on the client 250 of a user who follows the SNS account. On the timeline, messages posted by other accounts followed by the user are arranged and displayed in the chronological order of posting. Note that the user needs to log in to the SNS application 701 in advance using his/her account via the web browser 601 of the client 250.

The processing performed by the message combining portion 411 of the server 301 to compile messages created by the message creation portion 406 into one notification message is implemented by a method of combining a plurality of created messages so as to arrange and display them, as shown in FIG. 13. When messages of the same status exist, the times may be arranged and notified without repeating the messages, in order to prevent repetitive notification of the same message to the user, as shown in FIG. 14.

For example, when notifying two pieces of status information ("printing completion") as in the examples of FIGS.

13 and 14, two notification messages are created for the respective pieces of status information and the client 250 is notified twice. In contrast, by notifying one notification message that compiles the notification contents, as in FIGS. 13 and 14, the notification count can be suppressed, and the user of the client 250 can be prompted to recognize the contents of the two pieces of status information.

Even if there is no notification count limitation of the SNS server, it is sometimes preferable to notify pieces of status information as one notification message, as in FIGS. 13 and 14. For example, when the server 301 receives pieces of status information from the single MFP 100, the pieces of status information may be compiled into one notification message regardless of the notification count limitation.

In the processing of FIG. 12 that is performed by the status information management portion 409 of the server 301, the user is notified of all pieces of status information of the MFP 100 that are stored in the status information storage portion 408. When status information about an error of the MFP 100 is stored in the status information storage portion 408, the user may be notified of this status information even if the error has already been recovered. This is not preferable in terms of usability. To prevent this, this embodiment will explain the status information management portion 409 that performs determination processing of, before notifying an error, inquiring of the MFP 100 whether the error has already been recovered, and if the error has already been recovered, not notifying the user (inhibiting notification to the user).

A table 1200 in FIG. 15 is a table that stores the status type of status information held by the status information management portion 409, and information representing whether the status information is an error. A status type 1201 represents each status name, has a value that does not overlap in the table 1200, and serves as a primary key when searching the table 1200 for a status. Error determination 1202 is truth value information (FALSE/TRUE) representing whether the status information is an error. Here, truth value information "FALSE" indicates that the status information is not an "error", and truth value information "TRUE" indicates that the status information is an "error".

Figure 16:
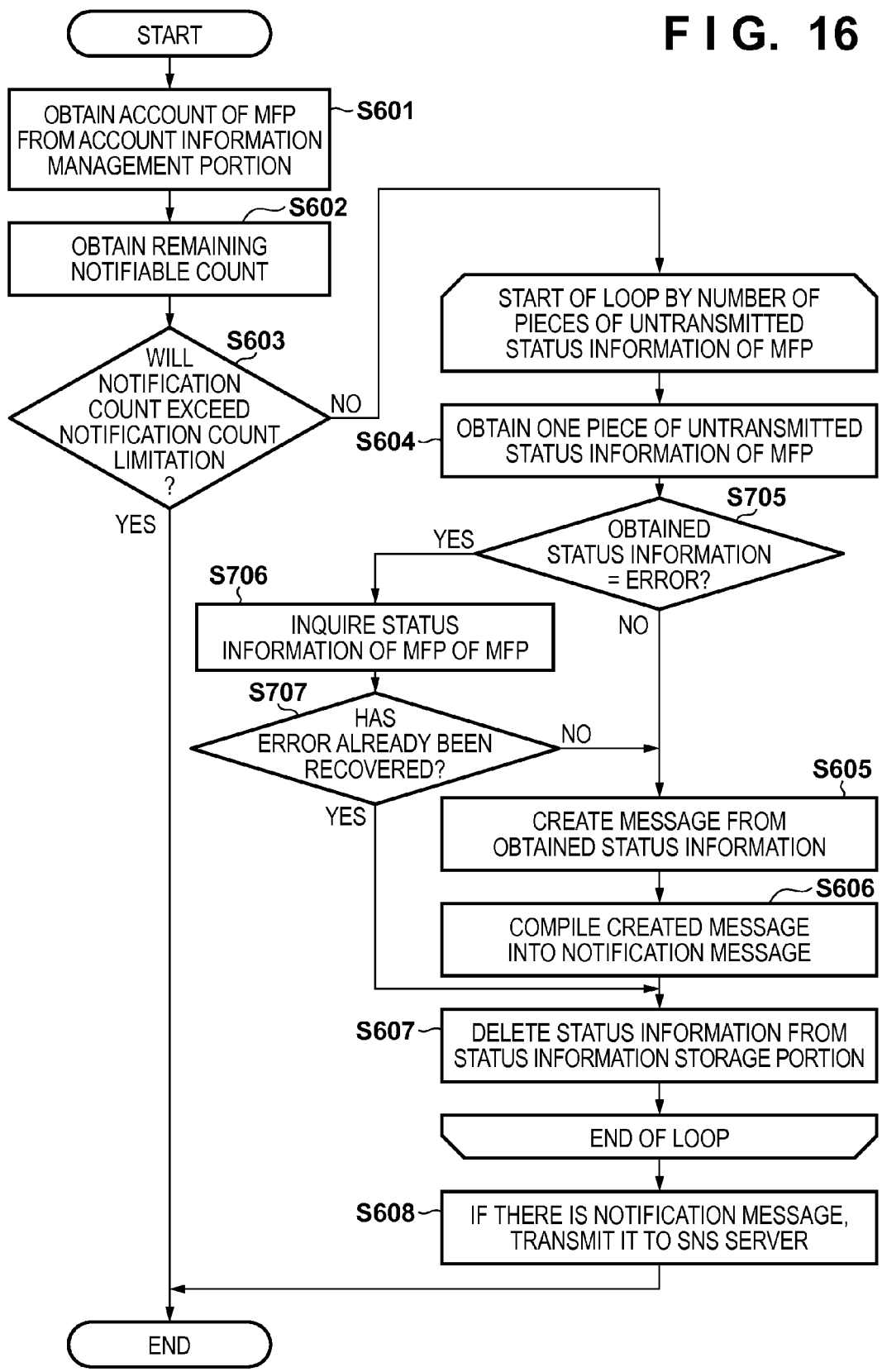
FIG. 16 is a flowchart showing the operations of the MFP and server.

FIG. 16 is a flowchart showing processing of automatically compiling and transmitting, by the status information management portion 409, pieces of untransmitted status information registered in the status information storage portion 408, excluding an error that has already been recovered. The processing shown in FIG. 16 is implemented by executing a program stored in the disk device 202 on the memory 204 by the CPU 201 of the server 301. In FIG. 16, the same step numbers denote the same processes as those in FIG. 12, and details thereof will not be repeated.

In step S705, the status information management portion 409 of the server 301 determines whether the truth value of the error determination 1202 defined for the status type 1201 of the table 1200 matching status information obtained by the status information storage portion 408 is TRUE. If the truth value is TRUE, the status information management portion 409 of the server 301 determines that the obtained status information is an error. If the truth value is FALSE, the status information management portion 409 of the server 301 determines that the obtained status information is not an error. If the status information management portion 409 of the server 301 determines that the obtained status information is not an error (NO in step S705), the process advances to step S605.

If the obtained status information is an error (YES in step S705), the status information management portion 409 of the server 301 inquires the latest status information of the MFP 100 in step S706. In step S707, the status information management portion 409 of the server 301 determines, by the inquiry to the MFP 100, whether the status information obtained from the MFP 100 includes the status information obtained from the status information storage portion 408. If the status information management portion 409 of the server 301 determines that the status information obtained from the MFP 100 includes the status information obtained from the status information storage portion 408 (NO in step S707), it determines that the error has not been recovered yet, and the process advances to step S605. If the status information management portion 409 of the server 301 determines that the status information obtained from the MFP 100 does not include the status information obtained from the status information storage portion 408 (YES in step S707), it determines that the error has been recovered, and the process advances to step S607.

As described above, according to the first embodiment, it is determined whether the notification count will exceed the notification count limitation in the real-time communication tool. If it is determined that the notification count will exceed the notification count limitation, pieces of status information are compiled and transmitted. This can eliminate the restriction on usability. When compiling and transmitting pieces of status information, it is determined whether there is an error that has already been recovered, and transmission of unnecessary status information can be avoided.

<Modification of First Embodiment>

In the first embodiment, status information, notification of which has been completed, is deleted from the table held by the status information storage portion 408, but the present invention is not limited to this. For example, even after status information is notified, it may not be deleted, and information representing completion/non-completion of notification may be added to the table so as to avoid repetitive notification of the same status information. Also, the table may be used for an arrangement in which once notified status information is notified again. Status information stored in the table is not limited to status information stored when the notification determination portion 405 of the server 301 determines that the notification count will exceed the notification count limitation. Instead, all pieces of received status information may be stored.

<Second Embodiment>

In the first embodiment, the server 301 utilizes the remaining notifiable count obtained from the real-time communication tool to determine whether the notification count will exceed a notification count limitation in the real-time communication tool.

The second embodiment will explain an arrangement in which a server 301 itself determines whether the notification count will exceed the notification count limitation. More specifically, in the second embodiment, the server 301 stores and manages a notification count to the real-time communication tool. Upon receiving status information, the server 301 determines, from the managed notification count, whether the notification count will exceed the notification count limitation. If the server 301 determines that the notification count will exceed the notification count limitation, it temporarily stores pieces of status information in a database, and compiles and notifies them later. Thus, even when no remaining notifiable count can be obtained from the real-time communication tool, it can be controlled not to exceed the notification count limitation. As a result, the server 301 can notify a client of pieces of status information, of which the user should be notified, without exceeding the notification count limitation in the real-time communication tool or missing status information.

Note that this embodiment will explain an example in which a status notification is transmitted from an MFP 100 to the server 301 upon completion of printing, as in the first embodiment. However, the status notification timing is not limited to this. As in the first embodiment, a status notification may be transmitted at an arbitrary timing before the start of printing, upon a change of the status, or the like. A status notification may also be transmitted by polling of inquiring status information of the MFP 100 from the server 301.

FIG. 17 is a block diagram showing the software configurations of respective apparatuses constituting a system.

As in the first embodiment, the server 301 includes a status notification service. Especially in the second embodiment, the server 301 controls notification of status information based on a notification count stored in the server 301 itself by using the status notification service.

The same reference numerals denote the same functions as those implemented by the status notification service in FIG. 8 according to the first embodiment, out of functions implemented by the status notification service according to the second embodiment, and details thereof will not be repeated.

A notification count obtaining portion 804 obtains the notification count of the MFP 100 from a notification history storage portion 812. Based on the notification count obtained by the notification count obtaining portion 804, a notification determination portion 805 determines whether the notification count will exceed a notification count limitation in a real-time communication tool. A status information management portion 809 manages a status information storage portion 408. The notification history storage portion 812 stores a notification history to an SNS server 302. A notification history management portion 813 manages the notification history storage portion 812. A timer controller 810 issues an instruction to the status information management portion 809 at a predetermined time interval to manage the status information storage portion 408, or issues an instruction to the notification history management portion 813 at a predetermined time interval to manage the notification history storage portion 812.

The client 250 and the SNS server 302 include a web browser 601 and an SNS application 701, respectively, as in FIG. 8 according to the first embodiment.

A table 1300 in FIG. 18 is a table that is held by the notification history storage portion 812 and stores notification history information for each MFP. An MFP_ID 1301 is an ID assigned to each MFP, has a value that does not overlap in the table 1300, and serves as a primary key when searching the table 1300 for the notification history information of the MFP. A notification count 1302 is a notification count to the SNS server 302. A final notification date & time 1303 is the date & time when the status notification was performed finally.

Figure 19:
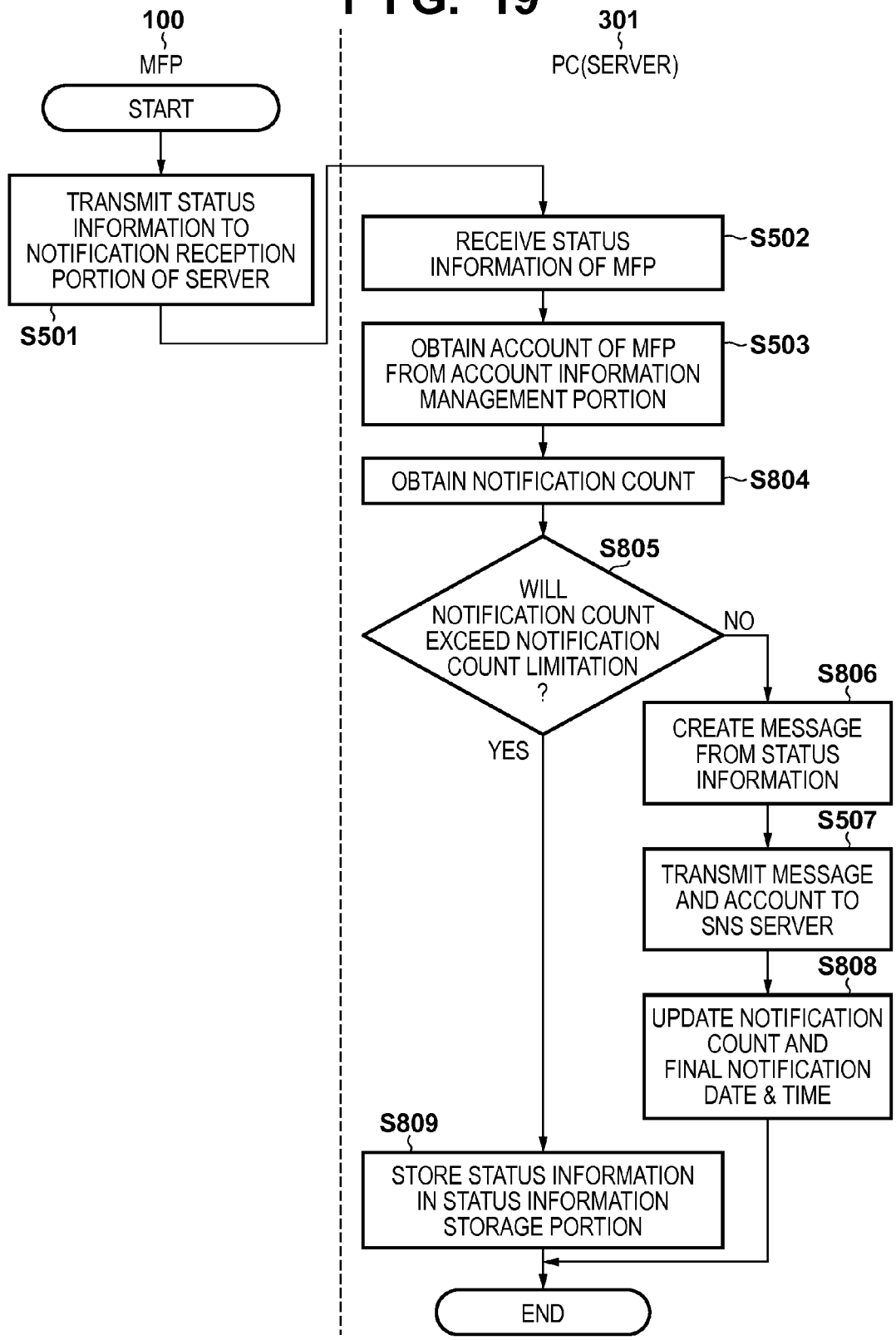
FIG. 19 is a flowchart showing the operations of the MFP and server.

FIG. 19 is a flowchart showing processing of notifying the SNS server 302 via the server 301 of the status of the MFP 100. The processing shown in FIG. 19 is implemented by executing a program stored in a program memory 106 on a work memory 107 by a CPU 105 of the MFP 100, and executing a program stored in a disk device 202 on a memory 204 by a CPU 201 of the server 301. In FIG. 19, the same step numbers denote the same processes as those in FIG. 11, and details thereof will not be repeated.

In step S804, the notification count obtaining portion 804 of the server 301 obtains the notification count 1302 defined for the MFP_ID 1301, matching the MFP 100, in the table 1300 held by the notification history storage portion 812. In step S805, the notification determination portion 805 of the server 301 determines, from the obtained notification count, whether the notification count will exceed a notification count limitation in the real-time communication tool. If the notification determination portion 805 of the server 301 determines that the notification count will not exceed the notification count limitation (NO in step S805), a message creation portion 406 of the server 301 creates a message from the status information obtained from the MFP 100 in step S806. After processing in step S507, the notification history management portion 813 of the server 301 increments the notification count 1302 defined for the MFP_ID 1301 of the table 1300 held by the notification history storage portion 812, and updates the final notification date & time 1303 in step S808.

If the notification determination portion 805 of the server 301 determines that the notification count will exceed the notification count limitation (YES in step S805), it adds the status information to the status information storage portion 408 in step S809.

FIG. 20 is a flowchart showing processing of automatically compiling and transmitting, by the status information management portion 809, pieces of untransmitted status information registered in the status information storage portion 408. The processing shown in FIG. 20 is implemented by executing a program stored in the disk device 202 on the memory 204 by the CPU 201 of the server 301. In FIG. 20, the same step numbers denote the same processes as those in FIG. 12, and details thereof will not be repeated.

Note that the remaining notifiable count in the real-time communication tool is reset at a predetermined timing, and the notifiable count can have a margin. If nothing is done, pieces of untransmitted status information stored in the status information storage portion 408 are endlessly accumulated to be an enormous amount. To prevent this, in accordance with an instruction from the timer controller 810, the status information management portion 809 executes processing of always monitoring the status information storage portion 408 in a predetermined cycle, and compiling and notifying pieces of notifications.

In step S901, the status information management portion 809 of the server 301 causes an account information obtaining portion 403 to obtain an SNS account 1002 that is defined for an MFP_ID 1001, matching the MFP 100, in a table 1000 held by an account information storage portion 402. In step S902, the status information management portion 809 of the server 301 causes the notification count obtaining portion 804 to obtain, from the notification history storage portion 812, a remaining notifiable count for the real-time communication tool corresponding to the SNS account.

In step S903, the status information management portion 809 of the server 301 causes the notification determination portion 805 to determine, from the notification count, whether the notification count for the SNS account will exceed the notification count limitation in the real-time communication tool. If the notification determination portion 805 determines that the notification count will exceed the notification count limitation (YES in step S903), the process ends.

If the notification determination portion 805 determines that the notification count will not exceed the notification count limitation (NO in step S903), the processes in steps S604 to S608 are executed. Then, in step S909, the status information management portion 809 of the server 301 causes the notification history management portion 813 to update the notification count 1302 and the final notification date & time 1303 in the notification history storage portion 812.

Figure 21:
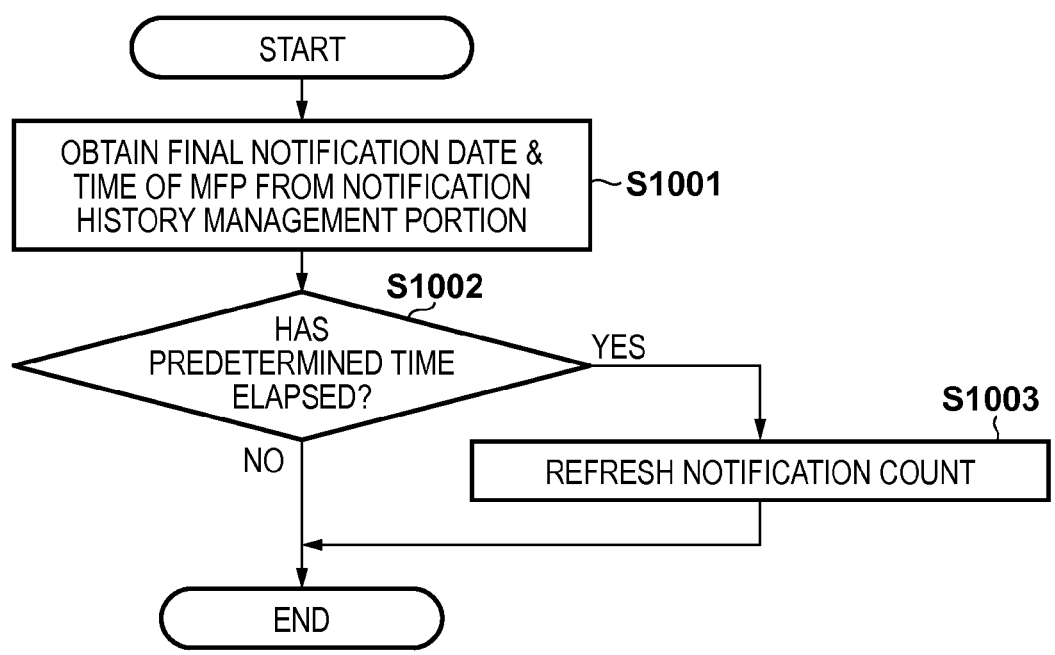
FIG. 21 is a flowchart showing the operation of the server.

FIG. 21 is a flowchart showing processing of automatically refreshing, by the notification history management portion 813, a notification count stored in the notification history storage portion 812. The processing shown in FIG. 21 is implemented by executing a program stored in the disk device 202 on the memory 204 by the CPU 201 of the server 301.

The remaining notifiable count in the real-time communication tool is reset at a predetermined timing, and the notifiable count can have a margin. In accordance with an instruction from the timer controller 810, the notification history management portion 813 executes processing of always monitoring the notification history storage portion 812 in a predetermined cycle, and refreshing the notification count.

In step S1001, the notification history management portion 813 of the server 301 obtains the final notification date & time 1303 defined for the MFP_ID 1301, matching the MFP 100, in the table 1300 held by the notification history storage portion 812. In step S1002, the notification history management portion 813 of the server 301 determines whether a predetermined time has elapsed from the final notification date & time. If the notification history management portion 813 of the server 301 determines that the predetermined time has not elapsed (NO in step S1002), the process ends. If the notification history management portion 813 of the server 301 determines that the predetermined time has elapsed (YES in step S1002), it refreshes in step S1003 the notification count 1302 defined for the MFP_ID 1301 in the table 1300 held by the notification history storage portion 812.

Note that processing to be executed by the SNS server 302 according to the processing of FIG. 20 is the same as that in the first embodiment. A message generated by a message combining portion 411 of the server 301 is also one as shown in FIG. 13 or 14.

As described above, according to the second embodiment, in addition to the effects described in the first embodiment, the server 301 itself stores a notification count to a real-time communication tool. Even when no remaining notifiable count can be obtained from the real-time communication tool, status information can be transmitted appropriately.

<Modification of Second Embodiment>

Needless to say, the same modification as that of the first embodiment can also be applied to the second embodiment. The arrangement according to the second embodiment may be combined with the arrangement according to the first embodiment.

<Third Embodiment>

In cloud printing according to the third embodiment, a server 301 performs queuing of a print job input to an MFP 100. In the third embodiment, when the server 301 receives a status notification from the MFP 100, it inquires input print jobs and determines whether the number of input print jobs is equal to or larger than a predetermined number. If the number of input print jobs is equal to or larger than the predetermined number, the server 301 stands by for reception of the printing completion notifications of the input print jobs, and compiles and transmits the printing completion notifications after reception, thereby controlling not to exceed the notification count limitation.

FIG. 22 is a block diagram showing the software configurations of respective apparatuses constituting a system.

As in the first embodiment, the server 301 includes a status notification service. Especially in the third embodiment, the server 301 receives status information from the MFP 100 by the status notification service. An input job information obtaining portion 965 (to be described later) inquires input print jobs of an input job management portion 964. Then, it is determined whether a predetermined number or more of print jobs have been input. If a predetermined number or more of print jobs have not been input, the server 301 creates a message from status information and transmits it to an SNS server 302. If a predetermined number or more of print jobs have been input, the server 301 performs the processing of standing by for the completion notifications of the input print jobs, and compiling and transmitting these notifications.

The same reference numerals denote the same functions as those implemented by the status notification service in FIG. 8 according to the first embodiment, out of functions implemented by the status notification service according to the third embodiment, and details thereof will not be repeated.

The input job management portion 964 performs queuing of input print jobs in cloud printing (printing by the MFP 100 from a client 250 via Internet 350 and the server 301). The input job information obtaining portion 965 obtains information of the input print jobs from the input job management portion 964. A notification determination portion 966 determines whether the number of print jobs input to the input job management portion 964 that has been obtained by the input job information obtaining portion 965 is equal to or larger than a predetermined number. A reception standby portion 970 stops the processing performed by the server 301 and causes the server 301 to stand by until all the completion notifications of the print jobs input to the input job management portion 964 are received.

The client 250 and the SNS server 302 include a web browser 601 and an SNS application 701, respectively, as in FIG. 8 according to the first embodiment.

FIG. 23 is a flowchart showing processing of notifying the SNS server 302 via the server 301 of the status of the MFP 100. The processing shown in FIG. 23 is implemented by executing a program stored in a program memory 106 on a work memory 107 by a CPU 105 of the MFP 100, and executing a program stored in a disk device 202 on a memory 204 by a CPU 201 of the server 301. In FIG. 23, the same step numbers denote the same processes as those in FIG. 11, and details thereof will not be repeated.

In step S1104, the input job information obtaining portion 965 of the server 301 obtains the number of print jobs input by the input job management portion 964. In step S1105, a notification determination portion 966 of the server 301 determines whether the number of print jobs is equal to or larger than a predetermined number. If the number of print jobs is not equal or larger than the predetermined number in step S1105 (NO in step S1105), a message creation portion 406 of the server 301 creates a message from status information in step S1106.

If the number of print jobs is equal or larger than the predetermined number (YES in step S1105), the reception standby portion 970 of the server 301 stands by in step S1107 until the completion notifications of the print jobs input to the input job management portion 964 are received. In step S1108, the message creation portion 406 of the server 301 creates a message from the status information and the completion notifications. In step S1109, a message transmission portion 407 of the server 301 transmits the message and account information to the SNS server 302.

Note that processing to be executed by the SNS server 302 according to the processing of FIG. 23 is the same as that in the first embodiment. A message generated by a message combining portion 411 of the server 301 is also one as shown in FIG. 13 or 14.

As described above, according to the third embodiment, it is confirmed whether there are print jobs input before notification to the real-time communication tool. If print jobs have been input, pieces of status information are compiled and transmitted after standby for the completion notifications of the print jobs. That is, even if whether to perform individual notifications for a plurality of notification items is not determined based on the notifiable count, the determination can be made based on the number of input print jobs.

For example, when many print jobs have been input, it can be determined that many notification items (for example, "printing completion") corresponding to these print jobs will be received later from the MFP. In this case, instead of individually notifying the notification item "printing completion", these notifications are compiled into one notification message in step S1108. As a result, the above-described determination can be appropriately made without obtaining a notifiable count from an external SNS server or managing a notifiable count by the server 301 itself. Since management of print jobs is performed regardless of notification of status information, the above-described determination can be appropriately made without an arrangement for notification such as management of a notifiable count.

Since it is reduced to display status notifications of the same type on the timeline successively a plurality of times, the visibility of the user can be improved. Further, since it is determined in advance that there is a status to be notified, processing of obtaining a remaining notifiable count in the real-time communication tool and determination processing can be reduced.

<Modification of Third Embodiment>

Needless to say, the same modification as that of the first embodiment can also be applied to the third embodiment. The arrangement according to either of the first and second embodiments may be combined with the arrangement according to the third embodiment.

<Fourth Embodiment>

Some home appliances and peripheral apparatuses frequently perform notification of the status. Depending on their characteristics, only when the server determines that the notification count will exceed the notification count limitation, all the received statuses are temporarily stored in a database, and compiled and notified later, instead of compiling and notifying statuses. The restriction on usability can be eliminated.

Note that the arrangement according to the fourth embodiment can also be arbitrarily combined with the arrangements according to the first, second, and third embodiments.

<Fifth Embodiment>

In the above-described embodiments, every transmission of status information or batch transmission after temporary storage is controlled based on, as the status information notification condition, the notifiable count of a notification service or the number of print jobs input to the MFP 100. However, the present invention is not limited to this. Notification of status information may be controlled using a combinational notification condition of these two conditions, or another notification condition.

The above-described embodiments have explained transmission/reception of status information when print processing is performed between the server 301 and the MFP 100. However, the present invention is not limited to this. For example, each of the above-described embodiments may be applied to transmission/reception of various kinds of status information in the MFP. For example, each of the above-described embodiments is also applicable to transmission/reception of status information when performing processing by various functions (for example, printer function, scanner function, storage function, and FAX function) implemented by the MFP.

The above-described embodiments have explained an example in which the server 301 for controlling the MFP 100 and the SNS server 302 for providing an SNS service are constituted as separate servers. In this case, the SNS server 302 serves as a notification destination apparatus that is notified of status information by the status notification service of the server 301. After that, the SNS server 302 transmits status information to the client 250. To the contrary, the server 301 and the SNS server 302 can also be implemented on the same server. In this case, the client 250 serves as a notification destination apparatus that is notified of status information by the status notification service of the server 301.

According to the above-described embodiments, pieces of status information (plurality of notification items) are compiled into one notification message. Even if the notification count has a limitation in the SNS server, as described above, notification can be performed within the limitation. Since the notification count is decreased regardless of the limitation, the user of a client apparatus that has received a notification can easily recognize the notification contents. Particularly when there are many notification items, a notification message including contents that compile the contents of these many notification items is created, and the user can easily recognize the contents.

The contents of a notification message have been explained by exemplifying the notification messages in FIGS. 13 and 14, but the present invention is not limited to this. For example, when 100 notification targets exist as printing completion notifications, a message representing the remaining number of notification items such as "Printing has been completed (printing completion time). Also, printing of 99 print jobs has been completed." may be created. Alternatively, for example, printing of eight print jobs out of 10 print jobs has been completed, but ink runs out for the two remaining print jobs, and an error is generated. In this case, the number of print jobs may be displayed for each type of notification item as a notification message such as "Printing of eight print jobs has been completed. Printing of two print jobs results in an error owing to the absence of ink."

A combination of messages is not limited to a combination into one message, but messages may be compiled into two or more messages. For example, as in the above-described example, printing of eight print jobs out of 10 print jobs has been completed, but the two remaining print jobs result in an error. In this case, a message "Printing of eight print jobs has been completed." and a message "Printing of two print jobs results in an error owing to the absence of ink." may be individually created. In this case, 10 messages are normally created for the respective print job. However, the notification is possible by the two messages by the above-described method, so the notification count can be suppressed.

The above-described embodiments have described an example in which the server 301 executes message creation processing, but the present invention is not limited to this. For example, as the server 301, one server apparatus may execute processing. Alternatively, as the server 301, a server system including a plurality of server apparatuses may execute processing. For example, servers that execute the respective modules 401 to 411 in the block diagram of the software configuration shown in FIG. 8 may be arranged and perform processing in cooperation.

The above-described embodiments have exemplified, as status information, information about a print job or the state of an apparatus such as a printer. However, the present invention is not limited to this. For example, when a new function is added as a function of a processing apparatus, information representing this function may be notified as status information. For example, when the apparatus is a printer, and a function regarding finishing of printing such as the stapling function or a function regarding communication such as an interface for receiving a print job is added, the user may be notified of the added function as status information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095509, filed May 2, 2014, which is hereby incorporated by reference wherein in its entirety.

What is claimed is:

1. An information processing apparatus comprising:
a memory device; and
a CPU in communication with the memory device, wherein the CPU is programmed to:
obtain a notification item regarding a status of a processing apparatus that executes predetermined processing; and
notify an external apparatus of a plurality of messages corresponding to obtained notification items as long as a number of the notification items obtained within a predetermined period does not exceed a predetermined number, and
notify, as for a plurality of notification items obtained over the predetermined number within the predetermined period, one message based on contents of at least some items out of the plurality of notification items obtained over the predetermined number.

2. The apparatus according to claim 1, wherein
the external apparatus includes an apparatus regarding a notification service configured to notify a message, and
the predetermined number includes a number based on a notification condition in the notification service.

3. The apparatus according to claim 2, wherein the predetermined number includes a number based on a notification count limitation of the notification service within the predetermined period.

4. The apparatus according to claim 3, wherein the CPU is further programmed to:
obtain a notifiable count of the notification service from the external apparatus, and
notify a message in accordance with the predetermined number based on the obtained notifiable count.

5. The apparatus according to claim 1, wherein the CPU is further programmed to:
store a notification history, and
notify a message in accordance with the predetermined number based on the stored notification history.

6. The apparatus according to claim 5, wherein the CPU is further programmed to:
determine, based on the stored notification history, whether to notify an obtained notification item in accordance with the obtaining, and
perform the notification in accordance with the determination.

7. The apparatus according to claim 6, wherein the CPU is further programmed to:
in a case where it is determined not to notify the notification item in accordance with the obtaining, save the notification item, and
notify one message of contents based on contents of the plurality of saved notification items.

8. The apparatus according to claim 1, wherein the CPU is further programmed to:
in a case where a plurality of obtained notification items include an item regarding an error of the processing apparatus, inquire of the processing apparatus whether the error has been recovered, and
in a case where it is determined that the error has been recovered, notify a message not including the item corresponding to the error.

9. The apparatus according to claim 1, wherein the CPU is further programmed to:
control the processing apparatus to execute a job to be processed by the processing apparatus, and
notify the message in accordance with the predetermined number based on the number of jobs to be processed by the processing apparatus.

10. The apparatus according to claim 9, wherein, in a case where the number of jobs to be processed by the processing apparatus exceeds the predetermined number, the CPU is further programmed to notify one message based on contents of all the plurality of notification items corresponding to the plurality of jobs.

11. The apparatus according to claim 1, wherein the processing apparatus includes a printing apparatus configured to print an image.

12. The apparatus according to claim 11, wherein the information processing apparatus includes a server connected to the printing apparatus via a network.

13. The apparatus according to claim 12, wherein the CPU is further programmed to:
perform the notification in accordance with, of a plurality of accounts corresponding to a plurality of printing apparatuses, an account corresponding to a printing apparatus that obtains a notification item, and
perform the notification depending on whether the number of notification items corresponding to the account exceeds the predetermined number.

14. The apparatus according to claim 1, wherein the status includes at least one of a job to be processed by the processing apparatus and a state of the processing apparatus.

15. An information processing system comprising:
a processing apparatus configured to execute predetermined processing; and
at least one server configured to obtain a notification item regarding a status of said processing apparatus,
wherein said at least one server notifies an external apparatus of a plurality of messages corresponding to obtained notification items as long as a number of the notification items obtained within a predetermined period does not exceed a predetermined number, and notifies, as for a plurality of notification items obtained over the predetermined number within the predetermined period, one message based on contents of at least some items out of the plurality of notification items obtained over the predetermined number.

16. A method in an information processing system, comprising:
causing at least one server to obtain a notification item regarding a status of a processing apparatus that executes predetermined processing; and
causing the at least one server to notify an external apparatus of a plurality of messages corresponding to obtained notification items as long as a number of the notification items obtained within a predetermined period does not exceed a predetermined number, and notify, as for a plurality of notification items obtained over the predetermined number within the predetermined period, one message based on contents of at least some items out of the plurality of notification items obtained over the predetermined number.

17. An information processing apparatus comprising:
a memory device; and
a CPU in communication with the memory device, wherein the CPU is programmed to:
obtain a notification item regarding a status of a processing apparatus that executes predetermined processing;
in a case where a notification item is obtained and a number of messages already notified within a predetermined period exceeds a predetermined number, notify an external apparatus of a message corresponding to the notification item after a wait until the number of messages becomes not larger than the predetermined number; and
in a case where a plurality of notification items wait for notification, notify, as for the plurality of notification items obtained over the predetermined number within the predetermined period, one message based on contents of at least some items out of the plurality of notification items obtained over the predetermined number.

18. An information processing system comprising:
a processing apparatus configured to execute predetermined processing; and
at least one server configured to obtain a notification item regarding a status of said processing apparatus,
wherein, in a case where a notification item is obtained from said processing apparatus and a number of messages already notified within a predetermined period exceeds a predetermined number, said at least one server notifies an external apparatus of a message corresponding to the notification item after a wait until the number of messages becomes not larger than the predetermined number, and
wherein, in a case where a plurality of notification items wait for notification, said at least one server notifies, as for the plurality of notification items obtained over the predetermined number within the predetermined period, one message based on contents of at least some items out of the plurality of notification items obtained over the predetermined number.

* * * * *